United States Patent
Shaffer et al.

(10) Patent No.: US 7,167,552 B1
(45) Date of Patent: Jan. 23, 2007

(54) QUORUMS IN MEET-ME CONFERENCE CALLS

(75) Inventors: Shmuel Shaffer, Palo Alto, CA (US); Charles J. Bedard, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 09/608,586

(22) Filed: Jun. 30, 2000

(51) Int. Cl.
H04M 3/42 (2006.01)

(52) U.S. Cl. .......................... 379/202.01; 379/203.01; 379/204.01; 379/205.01; 379/206.01

(58) Field of Classification Search ........... 379/201.01, 379/202.01, 203.01, 204.01, 205.01, 206.01, 379/88.17
See application file for complete search history.

(56) References Cited

U.S. PATENT DOCUMENTS

| | | | | |
|---|---|---|---|---|
| 5,483,588 | A * | 1/1996 | Eaton et al. | 379/202.01 |
| 5,761,294 | A | 6/1998 | Shaffer et al. | 379/230 |
| 5,970,126 | A | 10/1999 | Bowater et al. | 379/114 |
| 6,212,268 | B1 * | 4/2001 | Nielsen | 379/210.01 |
| 6,272,214 | B1 * | 8/2001 | Jonsson | 379/202.01 |
| 6,501,740 | B1 * | 12/2002 | Sun et al. | 379/202.01 |
| 6,694,351 | B1 * | 2/2004 | Shaffer et al. | 709/204 |
| 6,807,423 | B1 * | 10/2004 | Armstrong et al. | 455/440 |

OTHER PUBLICATIONS

Shmuel Shaffer and Charles J. Badard, pending U.S. Patent Application entitled "Call Optimization in Ad-hoc Conference Calls;" U.S. Appl. No. 09/572,199; filed May 17, 2000, including Specification: pp. 1-53; Drawings: Figures 1-18B on 19 sheets.

* cited by examiner

Primary Examiner—Ovidio Escalante
(74) Attorney, Agent, or Firm—Campbell Stephenson Ascolese LLP

(57) ABSTRACT

In one embodiment, a method for joining a meet-me conference call includes but is not limited to presenting an option to specify a quorum associated with a meet-me conference call, in response to user input to an application program co-resident with a terminal. In one embodiment, the user input includes but is not limited to an indication that the user is requesting to join a meet-me conference call. In one embodiment, the presenting an option to specify a quorum is done in response to the user input includes but is not limited to an indication that the user is requesting to specify a quorum either at the time at which a meet-me call is being scheduled, or at a time prior to a time at which a meet-me conference call is to transpire. In one embodiment, a method for adding a participant to a meet-me conference call includes but is not limited to querying a multipoint controller as to participants in or users waiting to join a meet-me conference call, in response to receiving a first message, from a Client Conference Manager Application co-resident with a terminal (Terminal-CCMA), that a user desires or is available to join a meet-me conference call; and sending a message containing the results of the querying to at least one Terminal-CCMA. In other embodiments, hardware and/or software effect the forgoing described method embodiments.

53 Claims, 23 Drawing Sheets

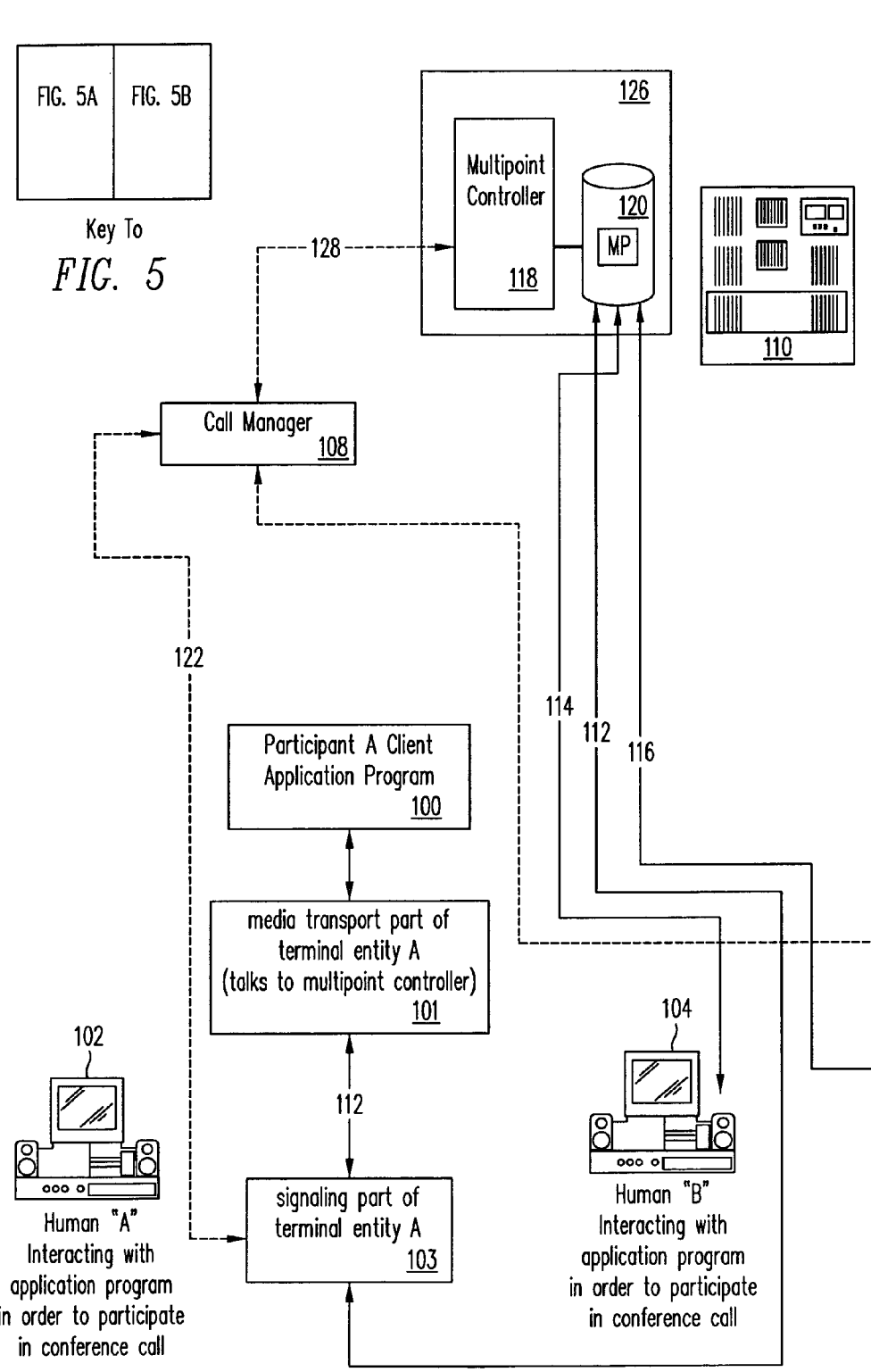

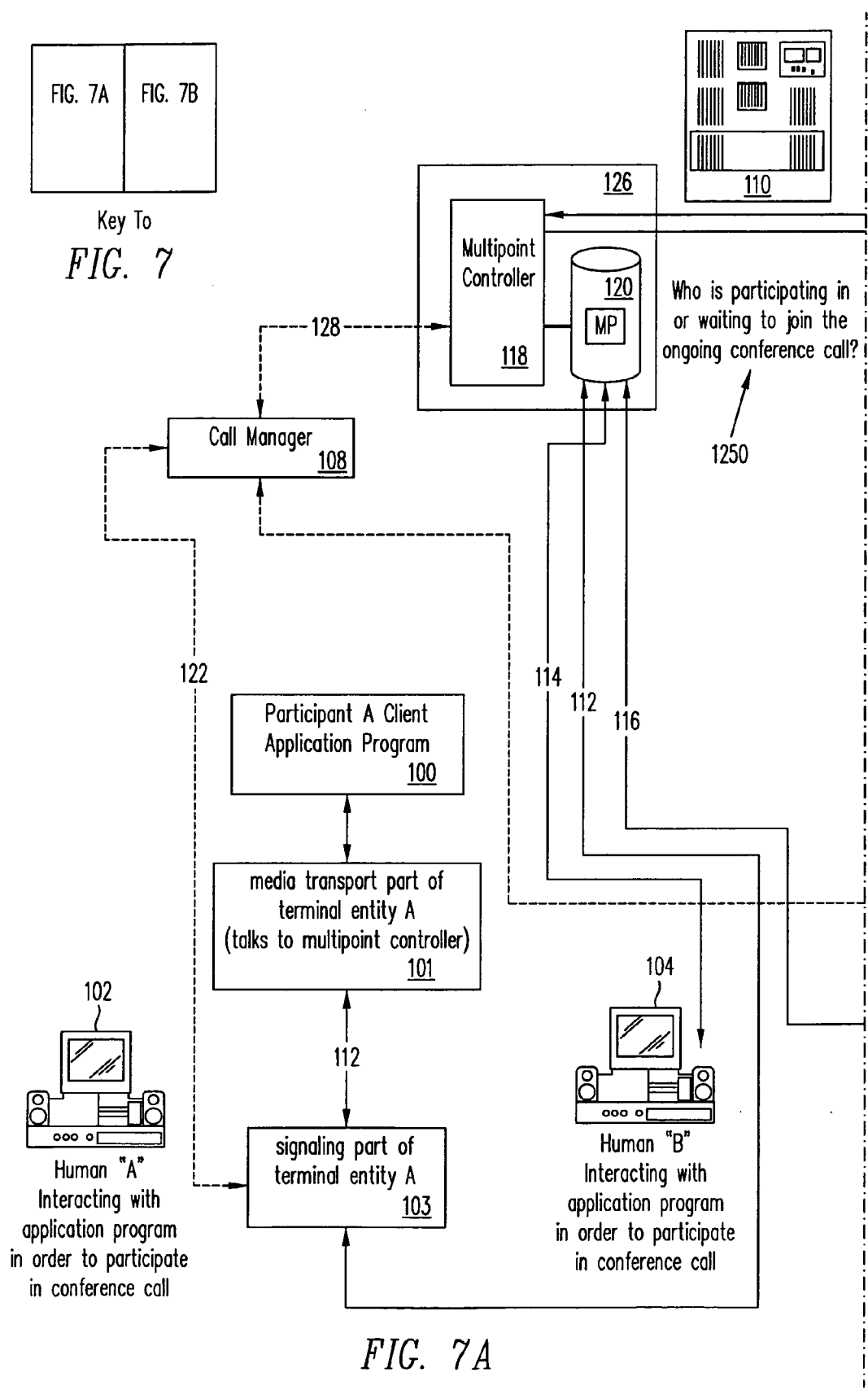

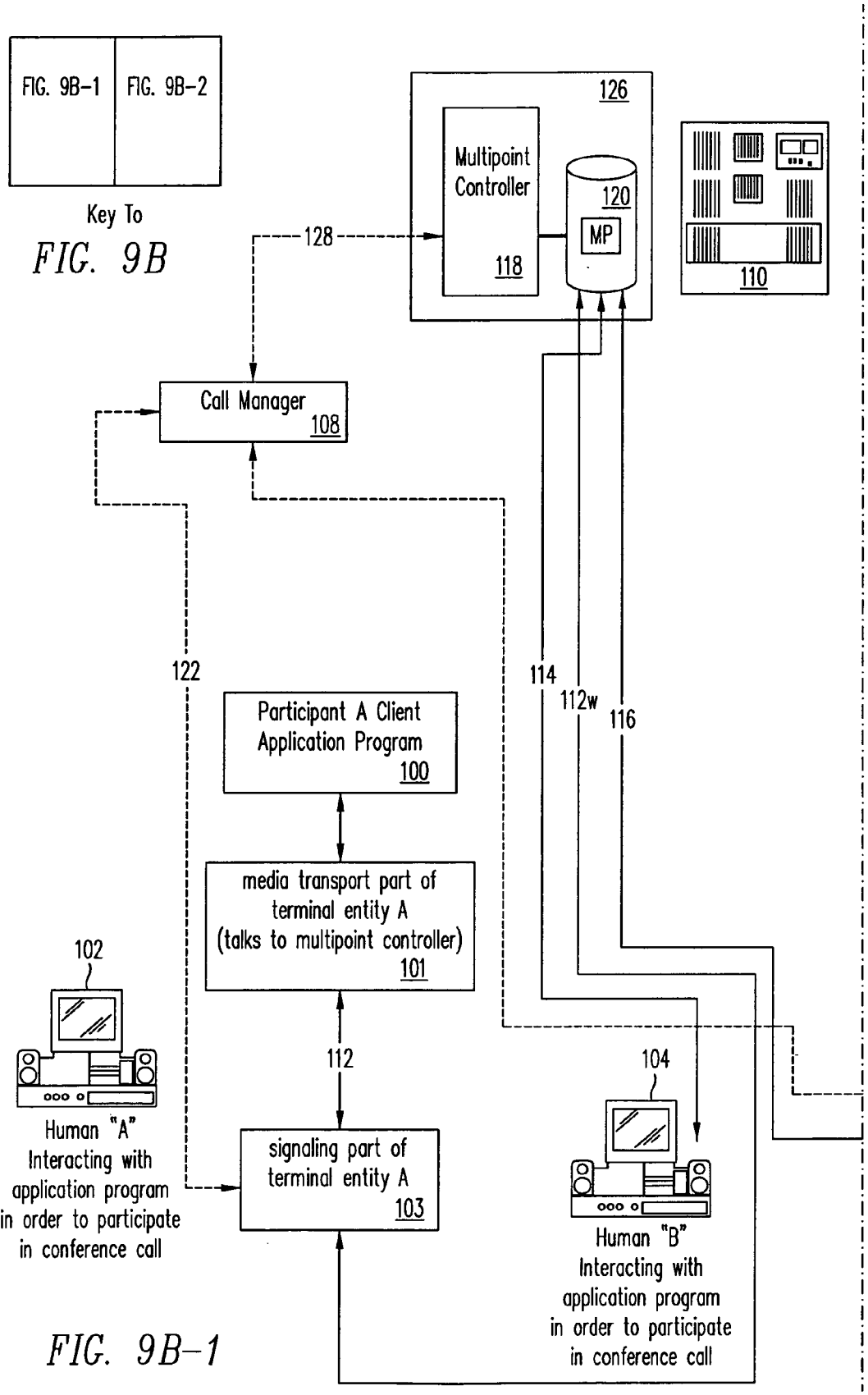

Key To

QUORUMS IN MEET-ME CONFERENCE CALLS

BACKGROUND OF THE INVENTION

The present invention is related to a method and system to be utilized in at least one data communications network wherein conference calls are established.

DESCRIPTION OF THE RELATED ART

A data communications network is the interconnection of two or more communicating entities (i.e., data sources and/or sinks) over one or more data links. A data communications network allows communication between multiple communicating entities over one or more data communications links.

A data communications network can be used to support a conference call. With reference now to FIG. 1, shown is a data communications network in a conference call configuration. Depicted are three humans A, B, and D interacting with application programs on computers 102, 104, and 106 in order to participate in a conference call. The interaction with the application programs typically involves the utilization of microphones, speakers, keyboards, and/or graphical user interfaces on computers 102, 104, and 106 (e.g., when a user speaks into a microphone and listens to a speaker of a computer where an application program is resident and running). For sake of clarity, only conferenced-in computer 102 is explicitly shown as having application programs 100, 101, and 103, but it is to be understood that similar application programs are present on computers 104 and 106, although such additional application programs are not shown.

For sake of illustration, the discussion herein depicts and describes logical entities as if they are application programs running on computers. For example, multipoint controller 118 and multipoint processor 120 are depicted and described as if they are subprograms of conferencing engine 126 which is itself depicted and described as a program resident within and running on network computer 110; participant A client application program 100, media transport part 101 of terminal entity A, and signaling part 103 of terminal entity A are depicted and described as if they are programs resident within and running on computer 102; and user C client application program 132, media transport part 133 of terminal entity C, and signaling part 135 of terminal entity C are depicted and described as if they are programs resident within and running on computer 134. However, those skilled in the art will appreciate that such treatment is merely illustrative and that the logical entities depicted and described herein may be implemented as hardware or any combination of hardware and software (e.g., in one implementation multipoint processor 120 is actually a stand-alone processor). In addition to the foregoing, those skilled in the art will appreciate the fact that media transport channels are depicted herein as passing through signaling parts of terminals (e.g., signaling part 103 of terminal A) prior to terminating on media transport parts of terminals (e.g., media transport part of terminal entity A) is an indication that such channels are generally physically transmitted through network interface cards.

Illustrated is that media (e.g., audio or visual data presented to human users A, B, and D through their respective applications programs) exchanged between the application programs of conference call participants A, B, and D are carried by media transport channels 112, 114, and 116. As used herein, media transport channels refer to channels sufficient to meet defined media data transmission needs for individual conference calls. Those skilled in the art will recognize that the definition of such media data transmission needs can be pre-set by a particular data communications system, or can be set and/or reset by one or more conference call participants at call initiation and/or during a conference call. That is, as used herein the term "media transport channel" refers to a data communications channel sufficient to substantially meet such user media transmission requirements.

Media transport channels 112, 114, and 116 respectively connect individual media transport parts of terminal entities, resident on computers 102, 104, and 106, with multipoint processor 120. However, for sake of clarity, only media transport part 101 of terminal entity A of computer 102 is shown, but it is to be understood that similar media transport parts are present on computers 104 and 106, although such media transport parts are not shown. Multipoint processor 120 is a conferencing engine 126 component that ensures that data is appropriately mixed and sent to various participants engaging in the conference call (e.g., data received over media transport channel 112 is mixed and sent out over media transport channels 114 and 116).

The establishment of media transport channels such as media transport channels 112, 114, and 116 is managed by call manager 108. Call manager 108 establishes and tears down media transport channels in response to call management signals sent to call manager 108 by multipoint controller 118, and signaling parts of terminal entities located within computers 102, 104, and 106. For ease of illustration, only one signaling part of a terminal entity (i.e., signaling part 103 of terminal entity A resident within computer 102) is shown, but it is to be understood that similar signaling parts are present on computers 104 and 106, although such signaling parts are not shown.

With reference now to FIG. 2, shown is event 300 wherein, in response to dial tone presented by call manager 108, human user C inputs (e.g., by a numeric keypad of computer 134) the previously-assigned (in meet-me conference calls, the human user typically knows the phone number and the password associated with the meet-me conference in advance) telephone number of the conference call service maintained by multipoint controller 118, into user C client application program 132. In response, user C client application program 132 causes signaling part 133 of terminal entity C to send message 302 to call manager 108 wherein call manager 108 is informed of the telephone number of the conference call service maintained by multipoint controller 118. In response, call manager 108 sends message 304, over call management signaling channel 128, to multipoint controller 118 directing that multipoint controller 118 accept a media transport channel originating from media transport part 133 of terminal entity C.

Depicted is that, in response to message 304, media transport channel 144 is established with multipoint controller 118. Subsequent to the establishment of media transport channel 144, illustrated is event 310 of multipoint controller 118 answering (e.g., via human speech created by a speech synthesizer) "please enter your conference call password." In response, shown is event 312 of user C client application program 132 answering back with the previously-assigned password for the conference call, which is typically entered by human user C via one or more input devices of computer 134.

With reference now to FIG. 3, depicted is that, assuming the conference call associated with receipt of the password entered by human user C is still ongoing, in response to the entered password, call manager 108 communicates 500 with multipoint controller 118 and establishes a media transport channel between the appropriate port of multipoint processor 120 and the media transport part 135 of terminal entity C. Consequently, in response to communication 500, shown is that media transport channel 144 is established with multipoint processor 120. Note that in the event that the conference call associated with the password entered by human user C is no longer ongoing, multipoint controller 118 tells human user C, via communication over media transport channel 144 and through terminal C, that the conference call is no longer ongoing.

Those having skill in the art will recognize that significant "cost" (as used herein, the term "cost" can reflect network efficiency costs, monetary costs, reliability costs, or any combination of the foregoing) is associated with establishing and maintaining media transport channels. In addition to the foregoing, those having skill in the art will recognize that it is not uncommon for one or more human users to join a conference call only to find that a user necessary for the conference call to proceed is not present. In such cases, it is common for the human users to just remain conferenced-in until the user necessary to the conference call joins the conference call. It has been discovered by the inventors, and such discovery forms part of the inventive content of this patent application, that this related-art practice of having human users conferenced-in and waiting for one or more essential other human users generates significant costs that would be better avoided. Unfortunately, no practicable way of doing the foregoing exists in the prior art.

It is therefore apparent that a need exists in the art for a method and system that will substantially optimize calling by decreasing the costs associated with conference calls by providing a mechanism to allow users to choose to join a conference call only when one or more specified users are present and/or are waiting to join the conference call once it has been initiated.

SUMMARY OF THE INVENTION

The inventors have devised a method and system which, among other things, can be utilized to decrease the costs associated with conference calls by providing a mechanism to allow users to choose to join a conference call only when one or more specified users are present and/or are waiting to join the conference call once it has been initiated.

In one embodiment, a method for joining a meet-me conference call includes but is not limited to presenting an option to specify a quorum associated with a meet-me conference call, in response to user input to an application program co-resident with a terminal. In one embodiment, the user input includes but is not limited to an indication that the user is requesting to join a meet-me conference call. In one embodiment, the presenting an option to specify a quorum is done in response to the user input includes but is not limited to an indication that the user is requesting to specify a quorum either at the time at which a meet-me call is being scheduled, or at a time prior to a time at which a meet-me conference call is to transpire. In other embodiments, hardware and/or software effect the forgoing described method embodiments. In one embodiment, a method for adding a participant to a meet-me conference call includes but is not limited to querying a multipoint controller as to participants in or users waiting to join a meet-me conference call, in response to receiving a first message, from a Client Conference Manager Application co-resident with a terminal (Terminal-CCMA), that a user desires or is available to join a meet-me conference call; and sending a message containing the results of the querying to at least one Terminal-CCMA. In one embodiment, the sending a message containing the results of said querying to at least one Terminal-CCMA includes but is not limited to sending a message, to the querying Terminal-CCMA, containing notification that the at least one specific user is either participating in or waiting to join the conference call, in response to the querying showing that the at least one specific user is either participating in or waiting to join the conference call. In one embodiment, the sending a message containing the results of said querying to at least one Terminal-CCMA includes but is not limited to sending a message containing notification that at least one specific user is either participating in or waiting to join the conference call, in response to the querying showing that the at least one specific user is either participating in or waiting to join the conference call. In one embodiment, the sending a message containing the results of the querying to at least one Terminal-CCMA further includes but is not limited to originating a media transport channel to the terminal having the at least one Terminal-CCMA. In other embodiments, hardware and/or software effect the forgoing described method embodiments. In another embodiment, a system includes but is not limited to a computer program implementing the foregoing described method.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art, by referencing the accompanying drawings.

DETAILED DESCRIPTION OF THE DRAWINGS

The following sets forth a detailed description of a mode for carrying out embodiments described. The description is intended to be illustrative of the invention and should not be taken to be limiting.

Figure 1:
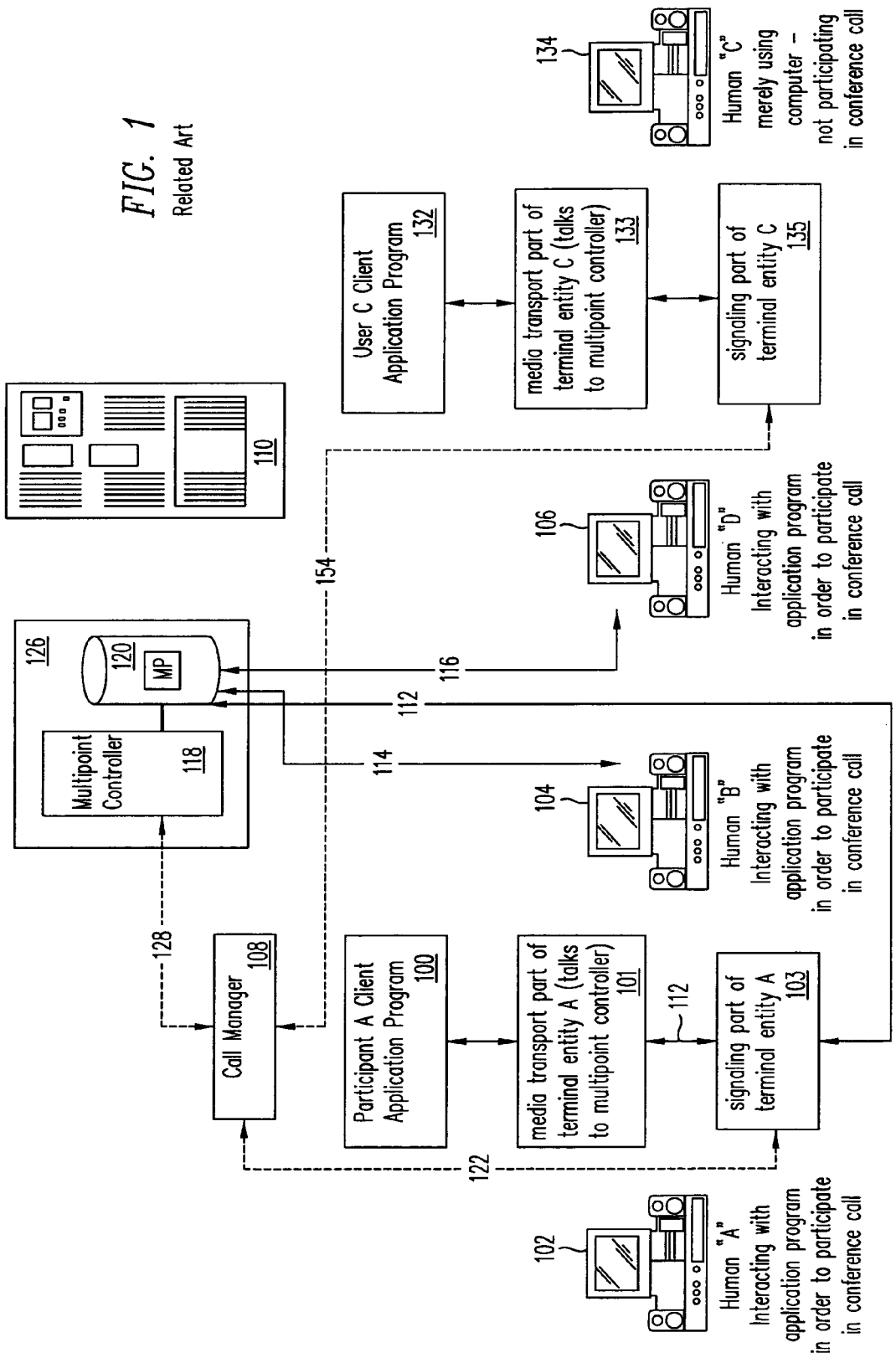
FIG. 1 shows a data communications network in a related-art conference call configuration.
Figure 2:
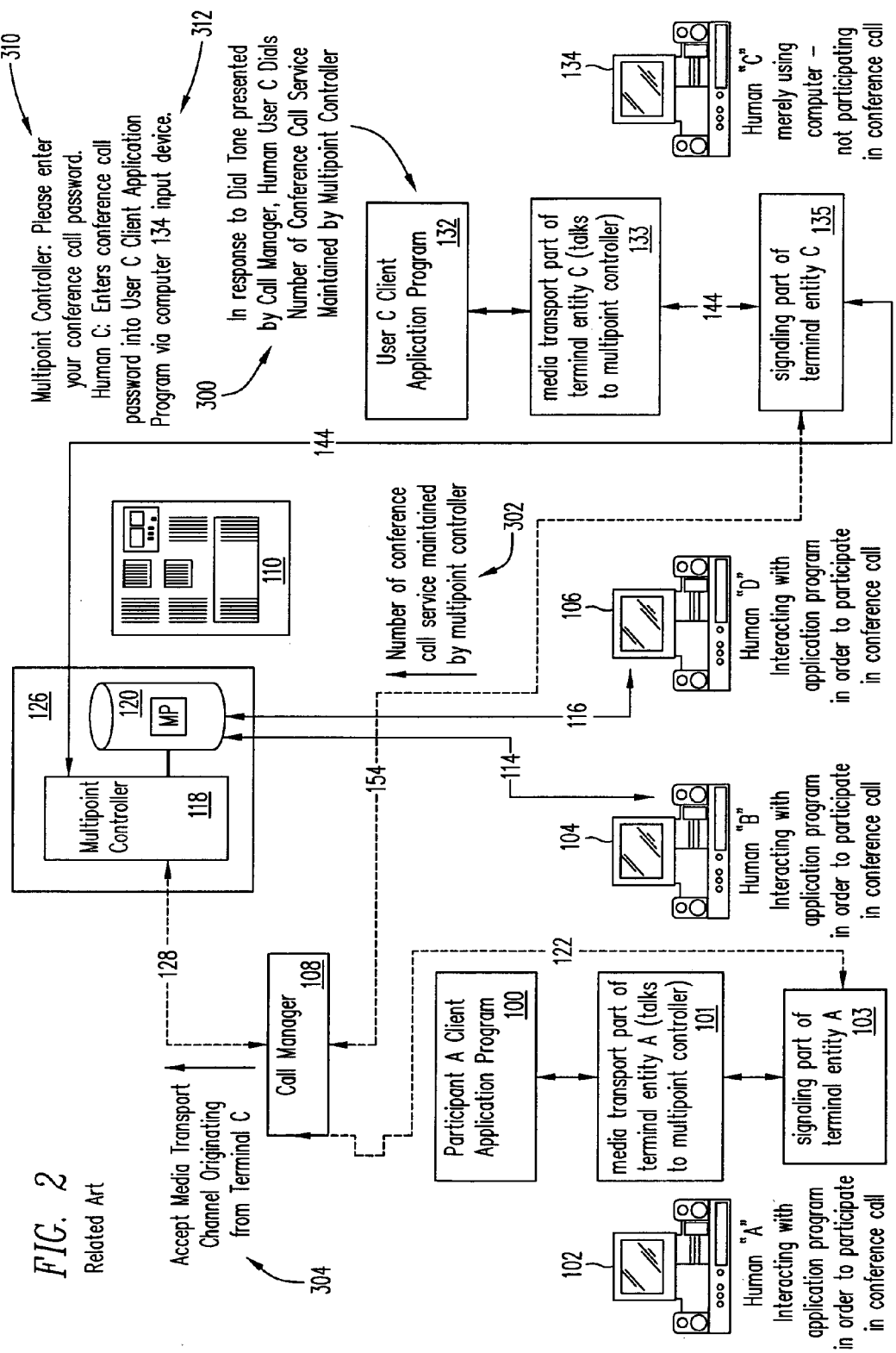
FIG. 2 depicts events associated with a user joining a related-art conference call.
Figure 4A:
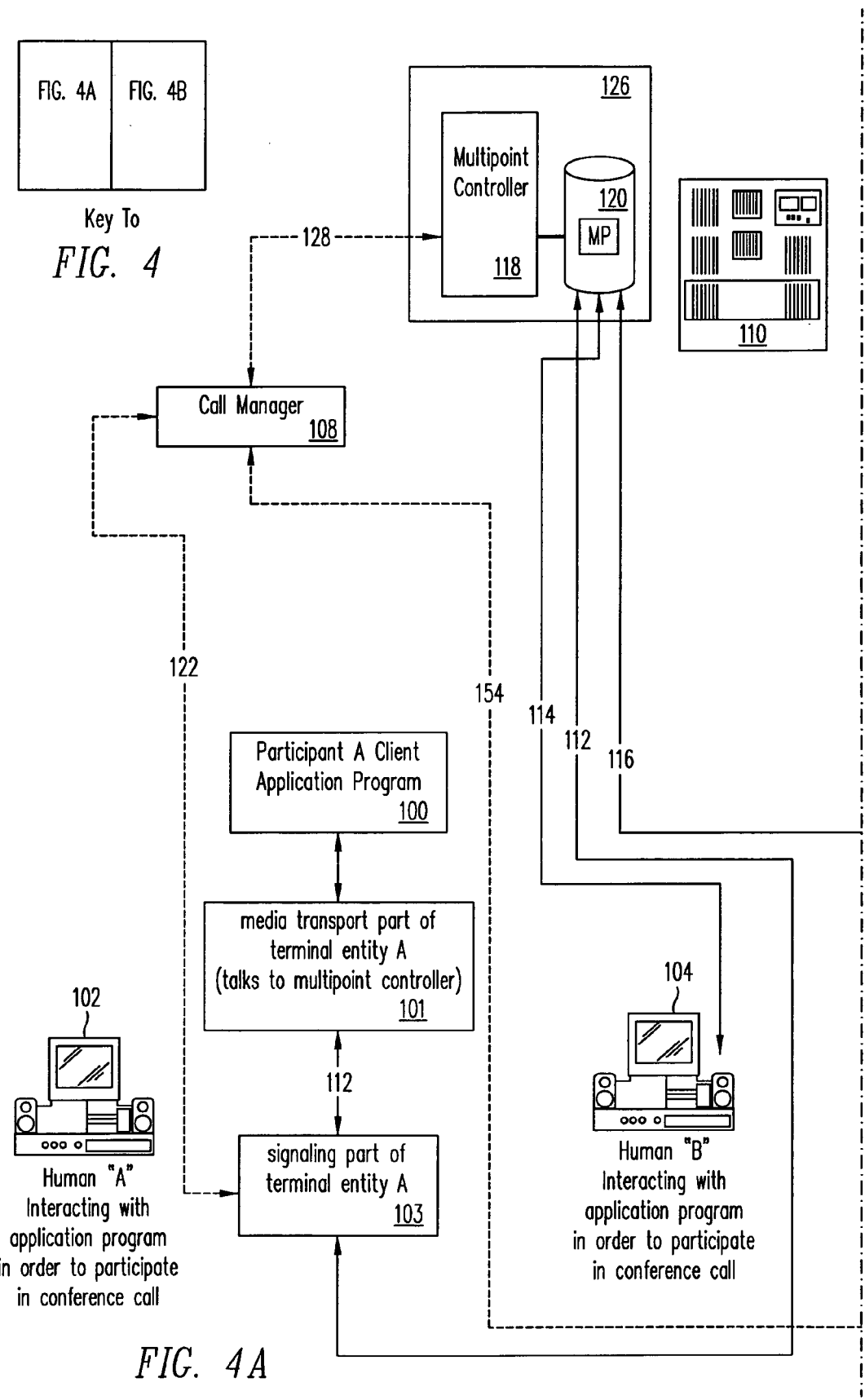
FIG. 4 shows how embodiments described herein begin to differentiate themselves from the related art at or around event 300 as was shown and described in relation to related-art FIG. 2.
Figure 4B:
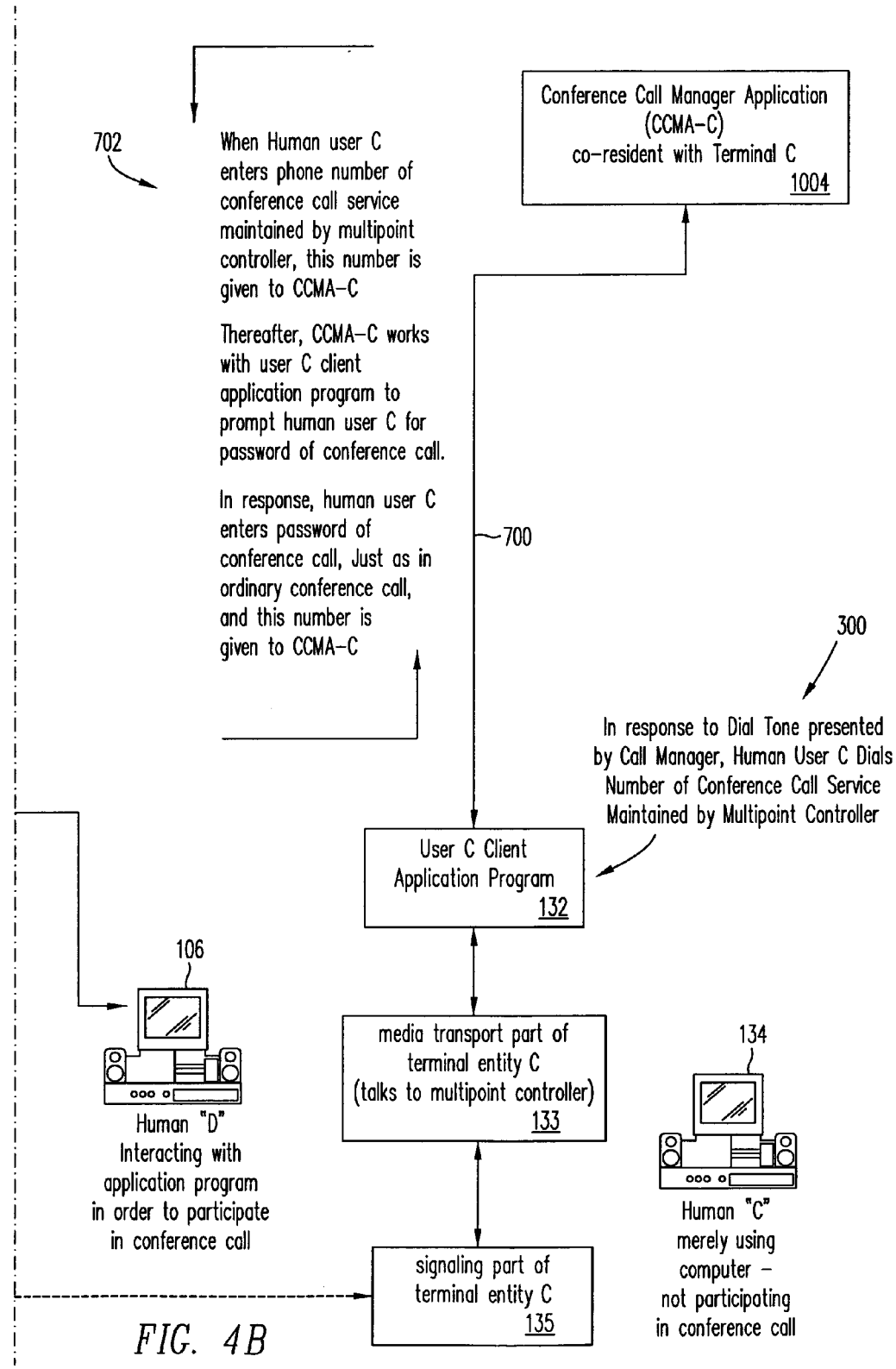

Referring now to FIG. 4, illustrated is a network assumed to have had a flow of events substantially similar to the flow of events shown in related-art FIG. 2, up to and including the event 300 of user C dialing the telephone number of the conference call service maintained by multipoint controller 118. However, depicted is that instead of the subsequent flow of events as described in relation to related-art FIG. 2, shown in FIG. 4 is that in response to event 300, once user C client application program 132 has learned via event 300 that terminal entity C is attempting to join a meet-me conference call (in one embodiment, via a maintained list of conference call service telephone numbers), user C client application program 132 logically connects 700 with client conference manager application co-resident with Terminal C (CCMA-C) 1004, depicted as a program resident within network computer 134, and informs CCMA-C 1004 that user C is attempting to join a meet-me conference call and passes CCMA-C 1004 the previously-input telephone number of the conferencing service. Thereafter, shown is that CCMA-C 1004 communicates and works with user C client application program 132, such that human user C is presented with the same "user experience" depicted and described in relation to related-art FIG. 2, in that CCMA-C 1004 communicates and works with user C client application program 132 such that human user C is prompted (typically via use of a voice synthesizer as described in relation to FIG. 2, above) for the password of the conference call. In short, CCMA-C 1004 communicates and works with user C client application program 132, such that it appears to human user C that he is in communication with multipoint controller 118 as described in relation to FIG. 2, when in point of fact all activity is taking place local to human user C's computer 134.

Figure 5B:
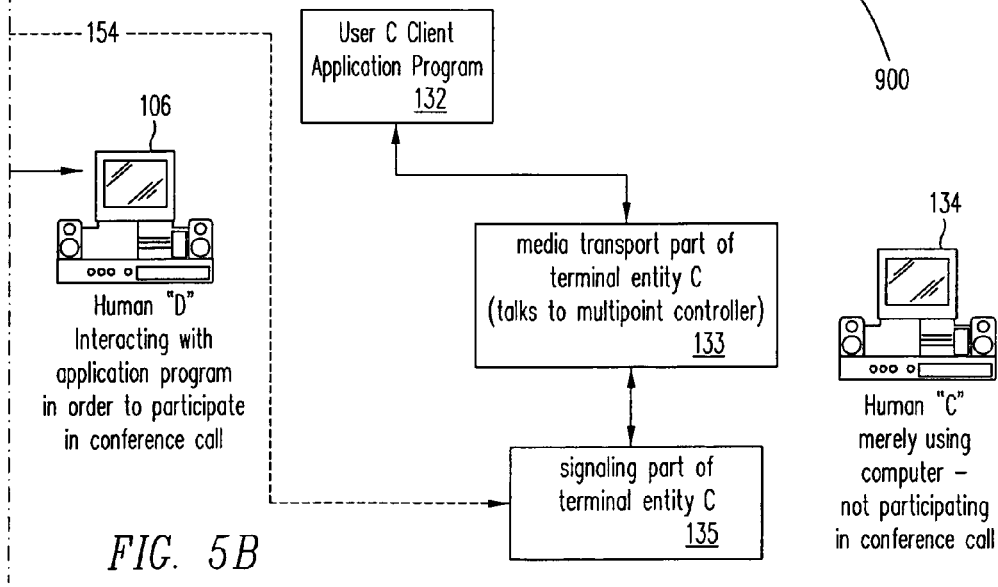
FIG. 5 illustrates that computer 110 (wherein multipoint controller 118 resides) and computer 134 (wherein terminal entity C resides) both have relatively constant access to one or more essentially free network connections whose properties, for one reason or another, render them insufficient to serve as media transport channels.

With reference now to FIG. 5, illustrated is that computer 110 (wherein multipoint controller 118 resides) and computer 134 (wherein terminal entity C resides) both have relatively constant access to one or more essentially free (i.e., very low cost, as the term "cost" was defined in the description of the related art section above) network connections whose properties, for one reason or another, render them insufficient to serve as media transport channels. (Such connections are types of "non-media-transport-channel-supporting" connections. The term "media-transport-channel-supporting connection," as used herein, means a network connection having capabilities sufficient to support defined media transport channel requirements such as were discussed in the description of the related art section above. The term "non-media-transport-channel-supporting connection," as used herein, means a network connection having capabilities which are NOT sufficient to support defined media transport channel requirements such as were discussed in the description of the related art section above.) For reasons that will become apparent below, CCMA-C 1004 is going to attempt to establish a channel, via use of one of those essentially free network connections, with its counterpart (e.g., MC-CMA 702 which will be introduced in FIG. 10) on computer 110.

Accordingly, once CCMA-C 1004 decides what type of connection it will use (e.g., CCMA-C 1004 decides to use an IP network connection), shown is that CCMA-C 1004 consults 900 directory 902 containing entries to associate connection addresses (e.g., telephone network numbers) with non-media-transport-channel-supporting connection addresses (e.g., different type protocol network addresses) in order to resolve the telephone number of the conference call service maintained by multipoint controller 118 to an IP address of computer 110 housing multipoint controller 118. With the address so determined, CCMA-C 1004 can establish the desired, or COA, channel.

Figure 6A:
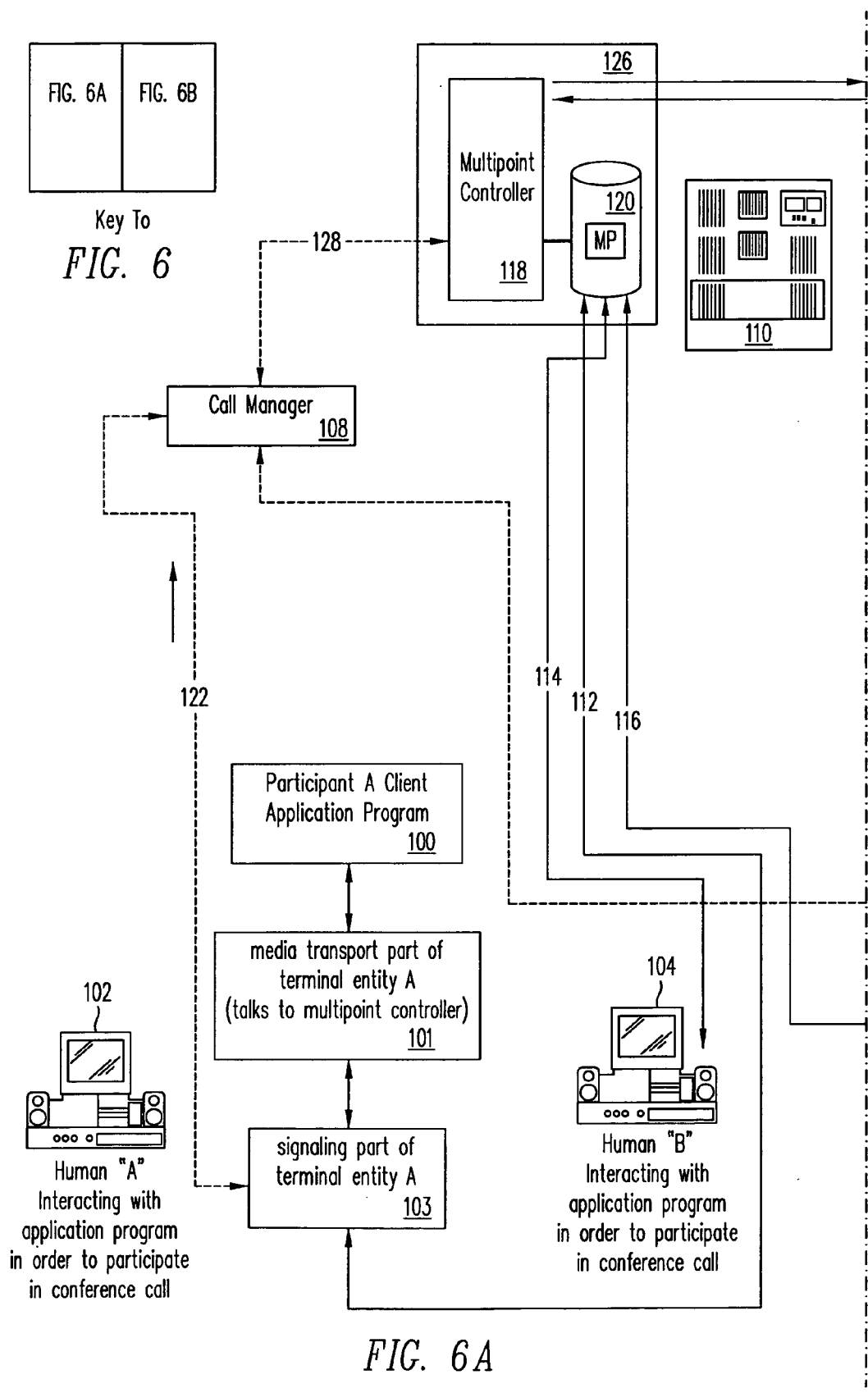
FIG. 6 depicts that COA channel 1002, which is a non-media-transport-channel-supporting connection, has been opened by use of the resolved non-media-transport-channel-supporting connection address described in relation to FIG. 9.
Figure 6B:
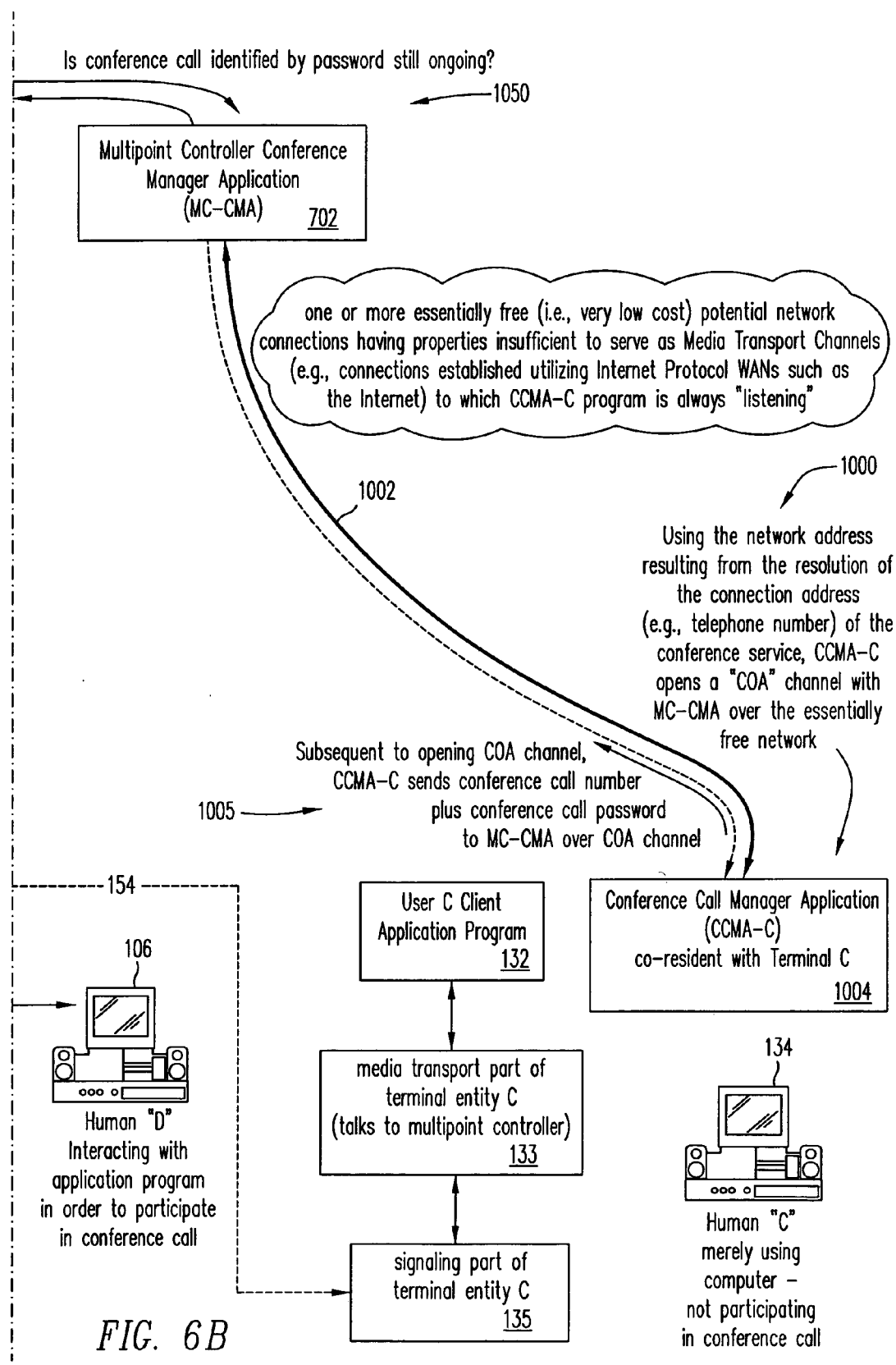

Referring now to FIG. 6, shown is that COA channel 1002, which is a non-media-transport-channel-supporting connection, has been opened by use of the resolved non-media-transport-channel-supporting connection address described in relation to FIG. 5. Depicted is that, subsequent to opening COA channel 1002, CCMA-C 1004 sends 1005 the conference call telephone number along with its associated conference call password, previously entered by human user C, to multipoint controller conference manager application (MC-CMA) 702 via COA channel 1002.

Figure 7B:
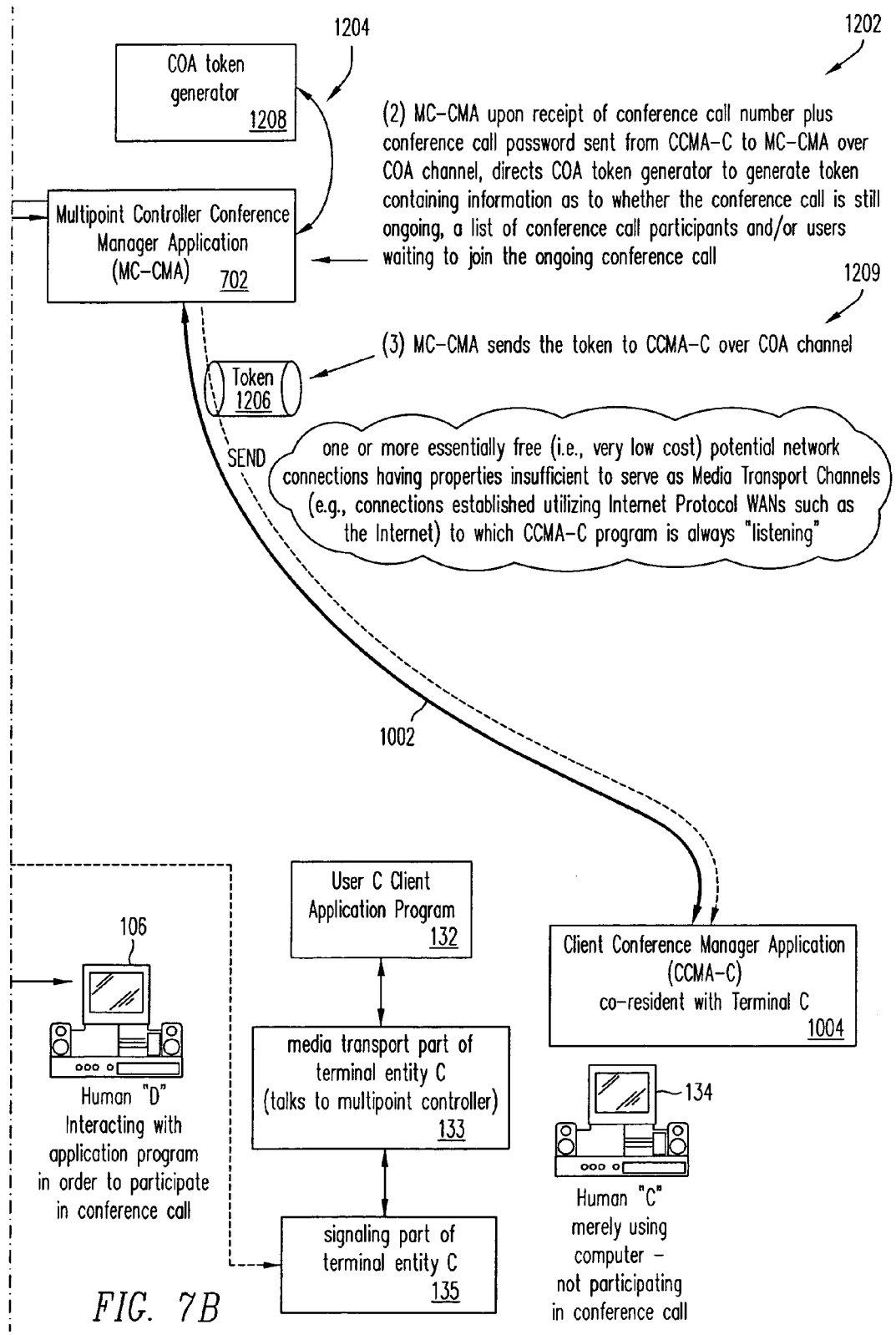
FIG. 7 illustrates event 1202 wherein is depicted that MC-CMA 702, upon receipt of the conference call telephone number and its associated conference call password contained within message 1005, directs 1204 COA token generator 1208 to generate token 1206 containing information including but not limited to information that the conference call to which human user C is seeking admission is still ongoing, a list of conference call participants and/or a list of users who have called in and are waiting to join the conference call.

Referring now to FIG. 7, illustrated is event 1202 wherein is depicted that MC-CMA 702, upon receipt of the conference call telephone number and its associated conference call password contained within message 1005, directs 1204 COA token generator 1208 to generate token 1206 containing information including but not limited to information that the conference call to which human user C is seeking admission is still ongoing, a list of conference call participants and/or a list of users who have called in and are waiting to join the conference call. Thereafter, event 1209 depicts that MC-CMA 702 sends token 1206 (containing the designated information) to CCMA-C 1004 over COA channel 1002.

Those skilled in the art will recognize that token 1206 may contain numerous fields containing information related to the invitation and/or call optimization criteria. In one embodiment, the token contains a "token ID" field, a "conference ID" field (identifying the ongoing conference call), a "network addresses of the computer wherein the multipoint controller/MC-CMA resides" field (utilized to allow alternate COA channel establishment and communication, since the COA channel can be established over many different types of networks, not all of which might be contained in the address resolution table discussed above), a "request that terminal accept a media transport channel originating from multipoint controller in order to join the ongoing conference call" field (where such request can be made for cost advantage or other reasons, as described below), a "secure conference password" field (to be used to enter a conference call should extra security be needed over and above that ordinarily required for a conference call), and a "names of other participants in the conference call" field.

Figure 8A:
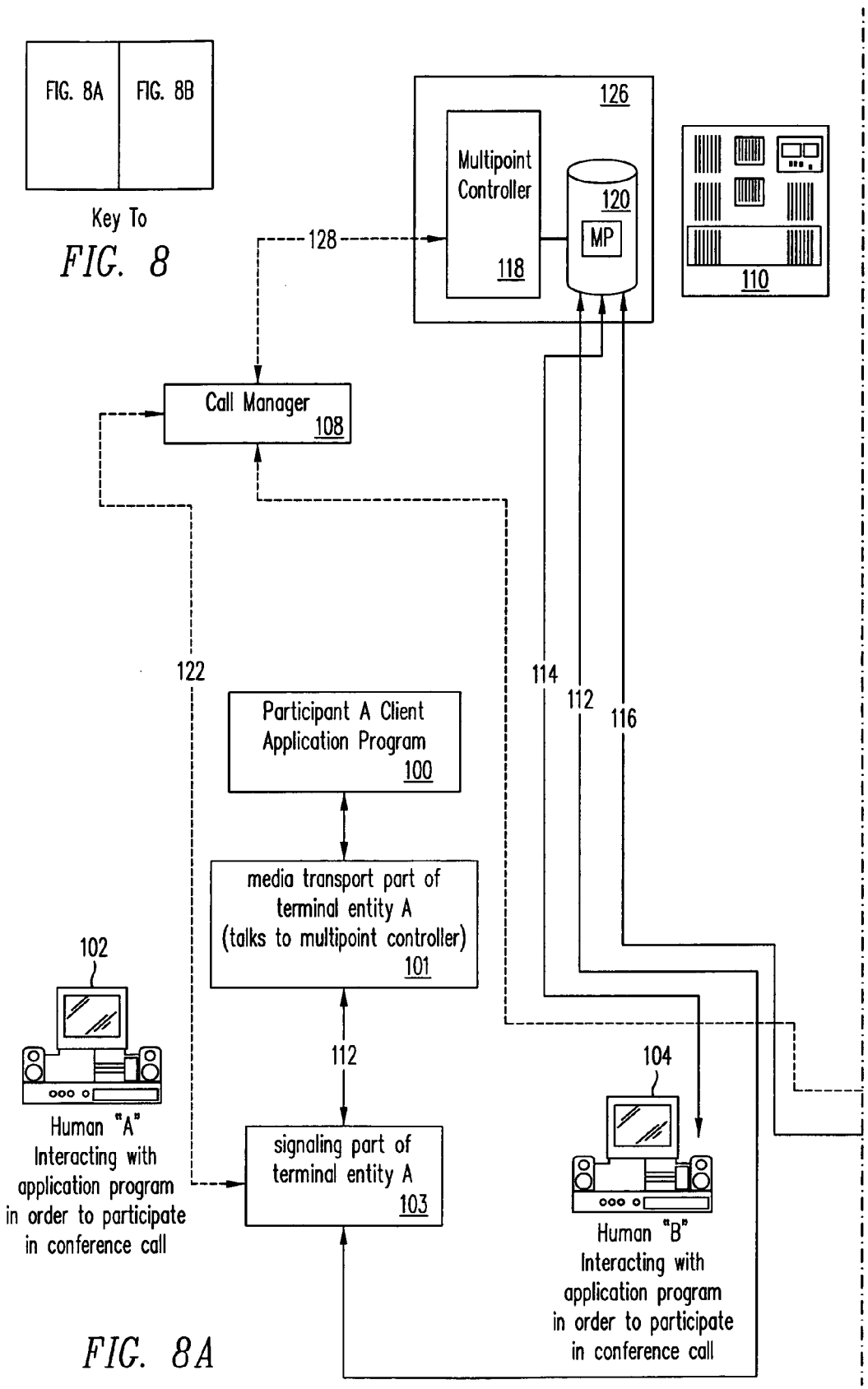
FIG. 8 shows CCMA-C 1004 displaying conference call options on a graphical user interface (GUI), in response to messaging sent by MC-CMA 702.
Figure 8B:
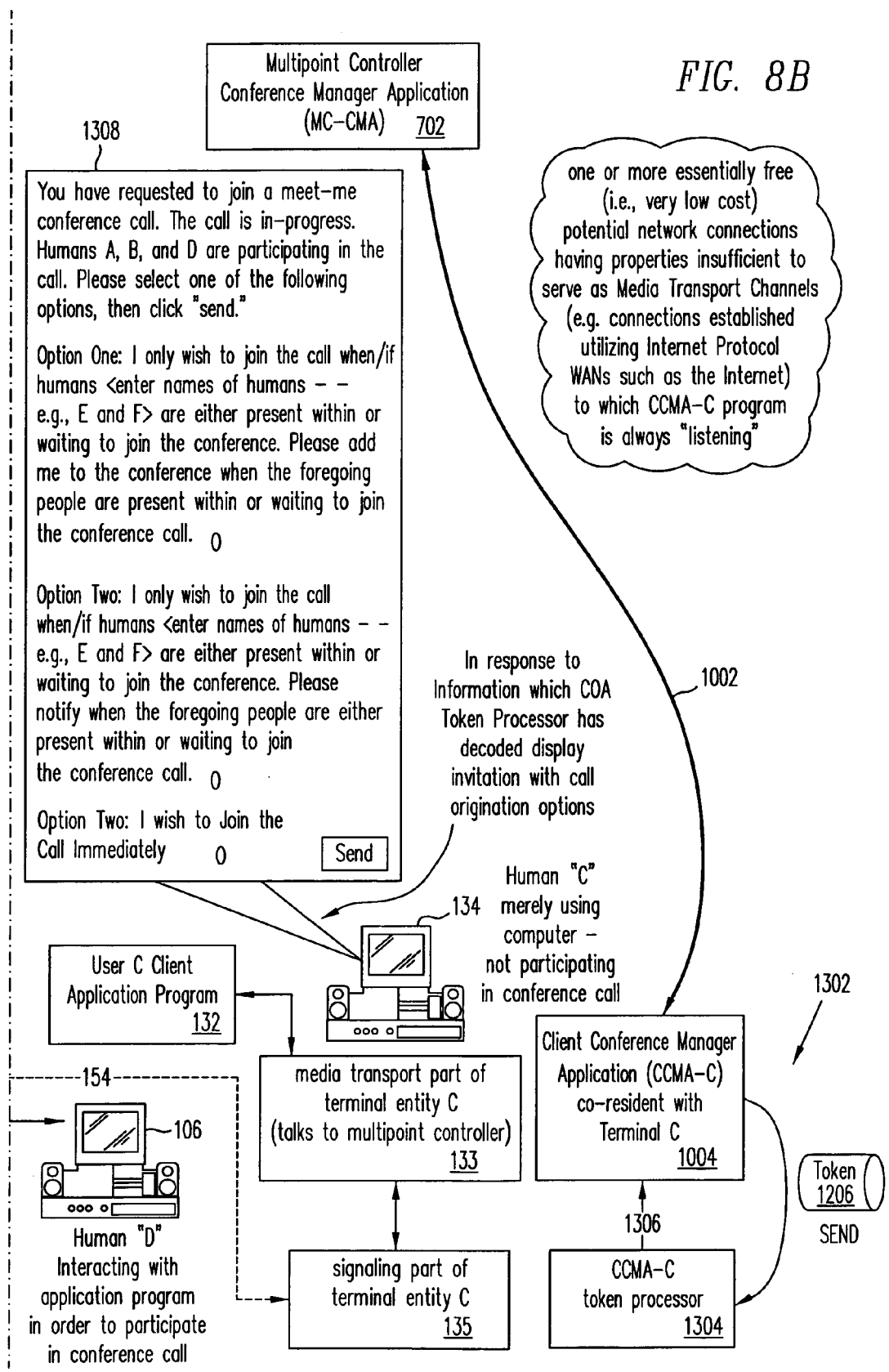

With reference now to FIG. 8, shown is that CCMA-C 1004 upon receipt of token 1206, passes 1302 token 1206 to CCMA-C-token processor 1304. CCMA-C token processor 1304 decodes the information in token 1206 and informs, via message 1306, CCMA-C 1004 of that information. Shown is that, in response to message 1306, CCMA-C 1004 presents graphical user interface (GUI) 1308 on a visual display device of network station 134. Depicted is that in one embodiment of GUI 1308, the user is presented with three options. Shown is that CCMA-C 1004, via GUI 1308, informs user C that the conference call which user C has asked to join is in progress, and presents a list of the participants and/or users waiting to enter the conference call. The first option asks user C if user C wants to enter the meet-me conference call when certain users (e.g., human users E and F) are either participating in or waiting to join the conference call. The second option asks user C if user C wants be notified and prompted to enter the meet-me conference call when certain users (e.g., human users E and F) are either participating in or waiting to join the conference call. The third option asks user C if user C wants to enter the conference immediately.

Figure 9A:
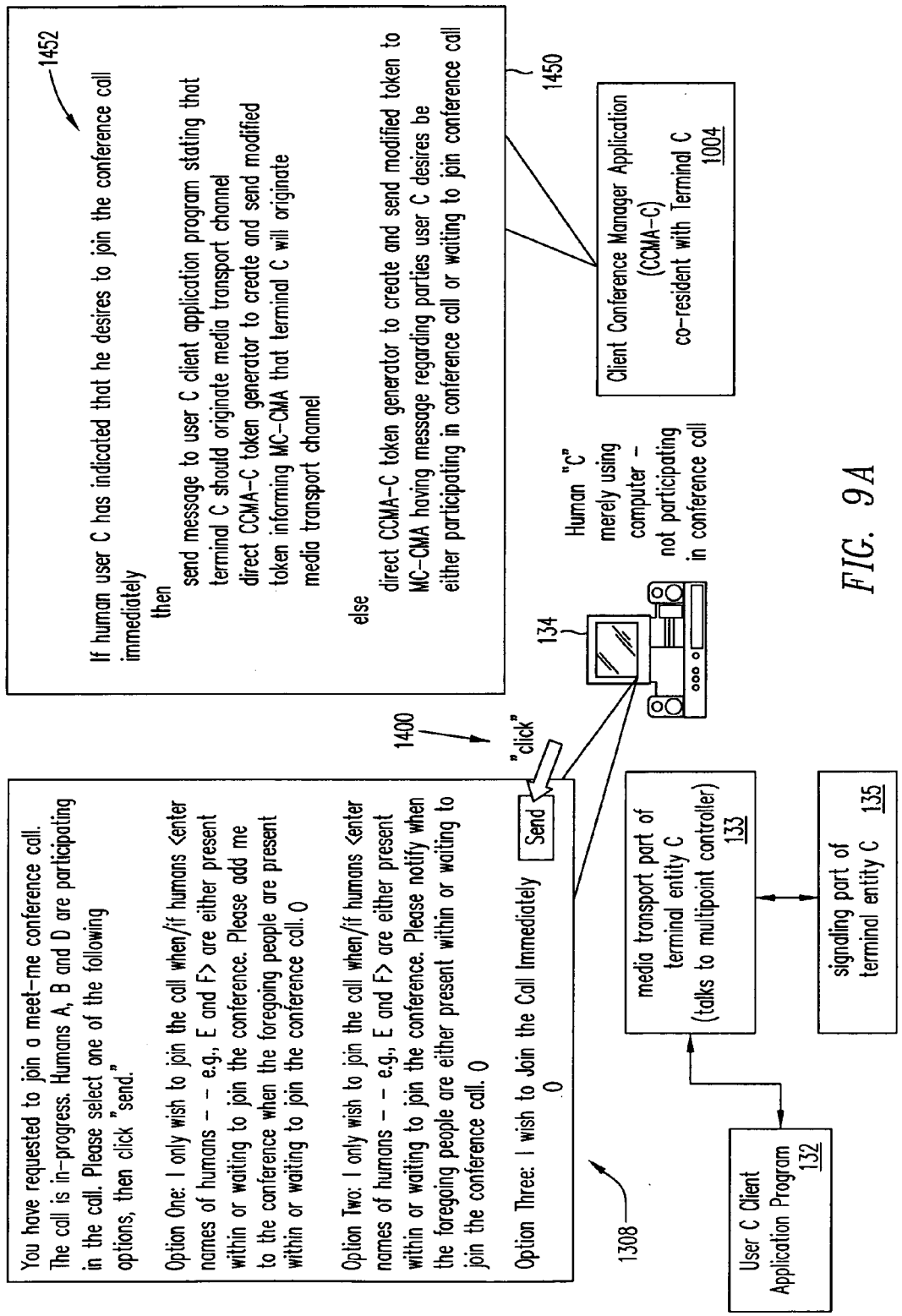
FIG. 9A depicts a process engaged in by CCMA-C 1004 in response to event 1400 of human user C "clicking" on the send button of GUI 1308.

Referring now to FIG. 9A, shown is event 1400 of human user C "clicking" on the send button of GUI 1308 with Option One of selected from among Options One, Two, and Three (which were described in relation to FIG. 8). (For sake of clarity, computer 134 and its associated displays and processes are shown in isolation, but it is to be understood that computer 134 is still resident within the network context depicted and described in FIG. 8 and previous figures.) Note that any choice among Options One, Two, or Three could be selected, but for sake of illustration, shown in FIG. 9A is that in response to Option One, human user C has indicated that he only wishes to join when user E and F are either conferenced-in or waiting to conference in to the ongoing conference call. Shown is that in response to event 1400, process 1450 (illustrated for clarity via pseudo-code, which is merely exemplary, and is meant to serve substantially the same purpose as a high-level logic flowchart) occurs.

Depicted is pseudo if-statement 1452 wherein CCMA-C 1004 determines whether human user C has indicated via his choices within GUI 1308 whether user C desires to join the conference call immediately. Illustrated is that in the event that pseudo if-statement 1452 yields a determination that human user C does desire to join the conference call immediately, shown is that CCMA-C 1004 sends a message to user C client application program 132 stating that terminal C should originate the media transport channel into the conference call.

In the event that, as a result of the inquiry of pseudo if-statement 1452, MC-CMA 702 determines that the input of human user C does not indicate that human user C desires to join the conference call immediately (i.e., user C indicates that he wishes to wait for other participants before joining the conference call), depicted is that CCMA-C 1004 directs CCMA-C token generator 1206 to create and send a modified token (illustrated in FIG. 9B, following) to MC-CMA 702 having a message regarding users which user C desires be either participating in the conference call or waiting to join the conference call.

Figures 2, 9B:
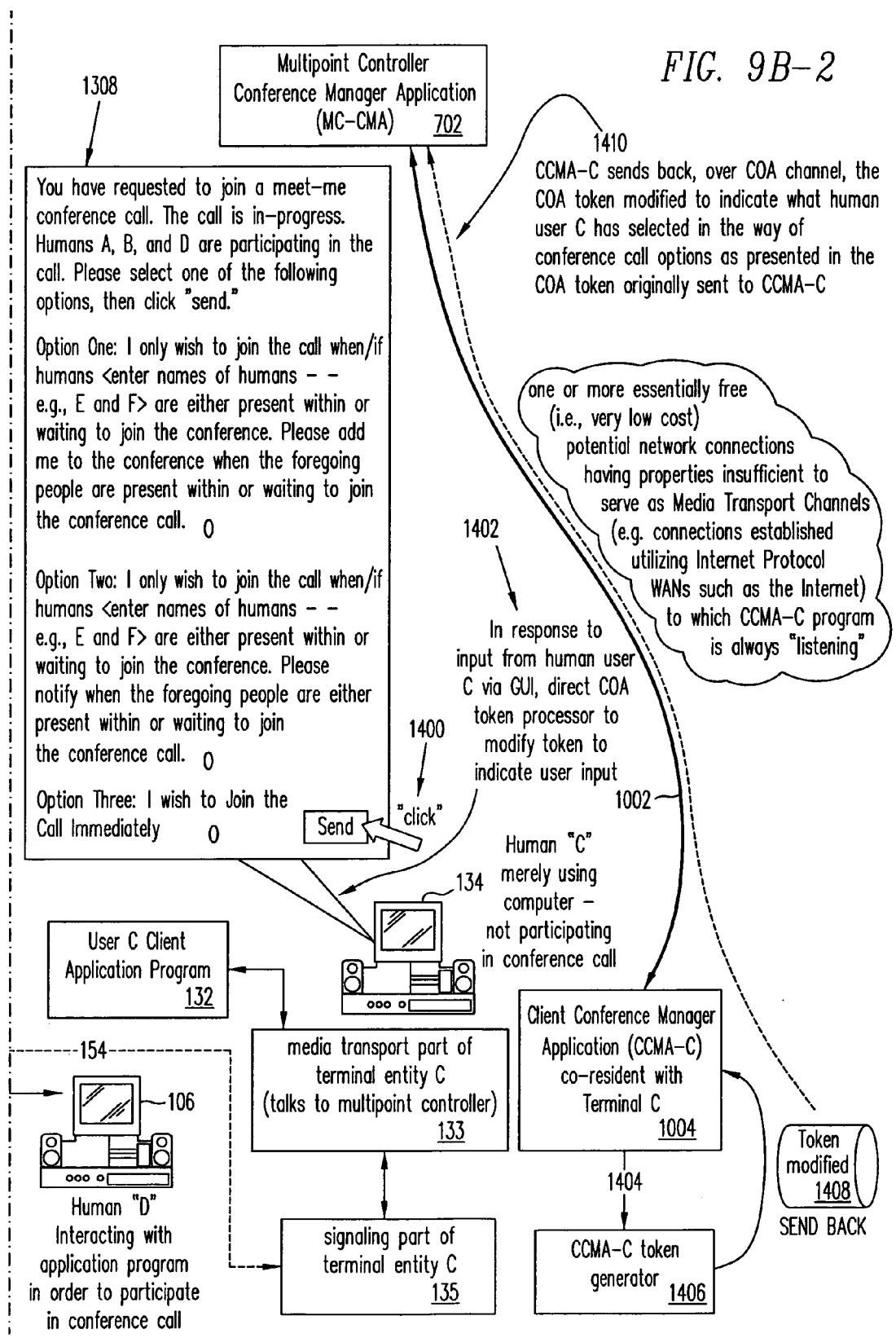
FIG. 9B illustrates messaging sent in response to event 1400 of human user C "clicking" on the send button of GUI 1308.

Referring now to FIG. 9B, shown is event 1400 as was described in relation to FIG. 9A. Thereafter, event 1402 depicts that in response to the input from human user C (e.g., the selection of Option 1) via GUI 1308 (in other embodiments, user input is effected via voice recognition and/or telephony user interface devices), CCMA-C 1004 sends message 1404 to CCMA-C token generator 1406 to modify token 1206 to indicate the conference call option selected by human user C's input. Thereafter, CCMA-C token generator 1406 passes modified-token 1408 to CCMA-C 1004 which thereafter sends 1410 modified-token 1408 (having fields modified to show the conference call options selected by human user C) back to MC-CMA 702.

Figures 10, 10A:
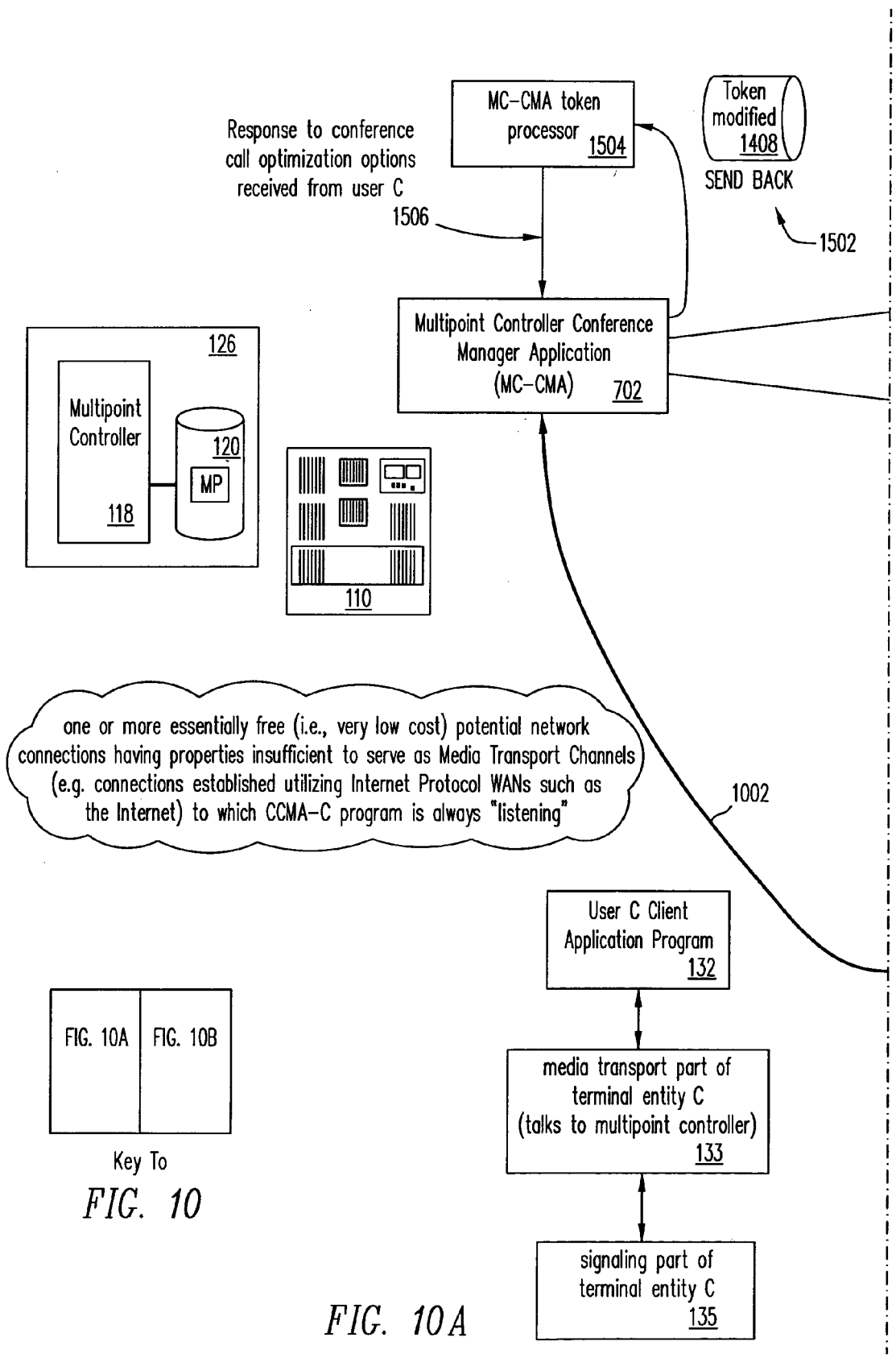
FIG. 10 shows actions of MC-CMA 702, upon receipt of messaging, sent by CCMA-C 1004, containing user response to conference call options.
Figure 10B:
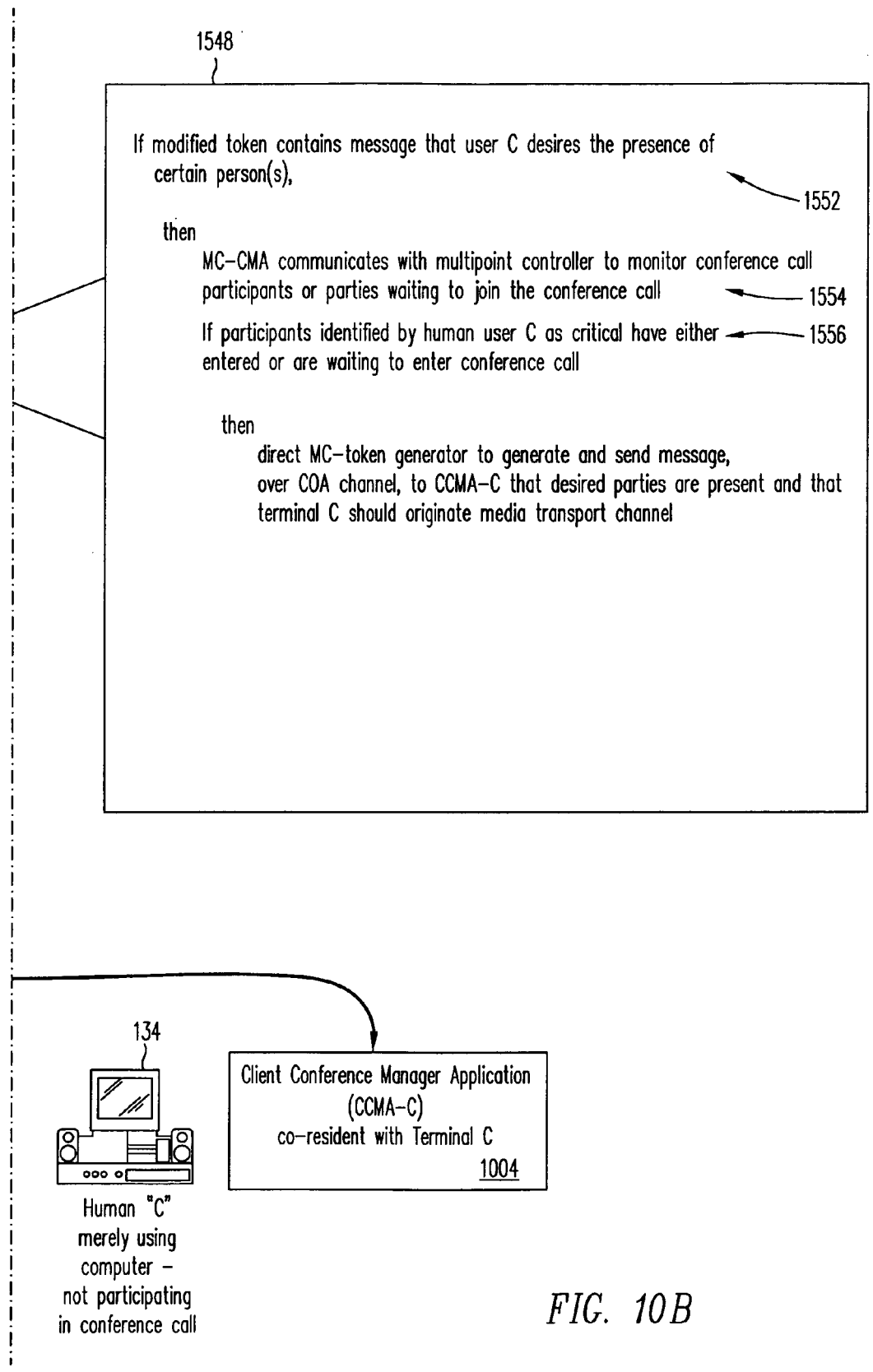

With reference now to FIG. 10, shown is that MC-CMA 702, upon receipt of modified-token 1408, passes 1502 modified-token 1408 to MC-CMA token processor 1504. MC-CMA token processor 1504 decodes the information in modified-token 1408 and informs, via message 1506, MC-CMA 702 of that information (e.g., user C's response to the presented conference call options as was illustrated in FIGS. 9A and 9B). Shown is that, in response to message 1506, MC-CMA 702 now knows information as to human user C's response to any conference call options which were presented via GUI 1308 described in relation to FIG. 8. Shown is that, in response to human user C's option choices, process 1548 occurs wherein the following actions and operations take place (where the actions are depicted via pseudo-code which is merely exemplary in the same way as a high-level logic flowchart).

Depicted is pseudo if-statement 1552 which shows that MC-COA 702 determines whether modified-token 1408 contained a message that user C desires the presence of certain person(s) to be either participating in or waiting to join the conference call. If, as a result of pseudo if-statement 1552, shown is that MC-CMA 702 determines modified-token 1408 contained a message that user C desires the presence of certain person(s) to be either participating in or waiting to join the conference call, then pseudo if-statement 1554 shows that MC-CMA 702 communicates with multipoint controller in order to monitor conference call participants or users waiting to join the conference call.

Depicted is pseudo if-statement 1556, wherein is shown that if it is subsequently determined, via the monitoring described in pseudo if-statement 1554, that the one or more participants identified by human user C as critical have either entered or are waiting to enter conference call, then MC-CMA 702 directs MC-token generator 1504 to generate and send a token, over COA channel 1002, containing a message to CCMA-C 1004 that the desired participants are present and that terminal C should originate a media transport channel with multipoint controller 118.

Figures 1, 11A:
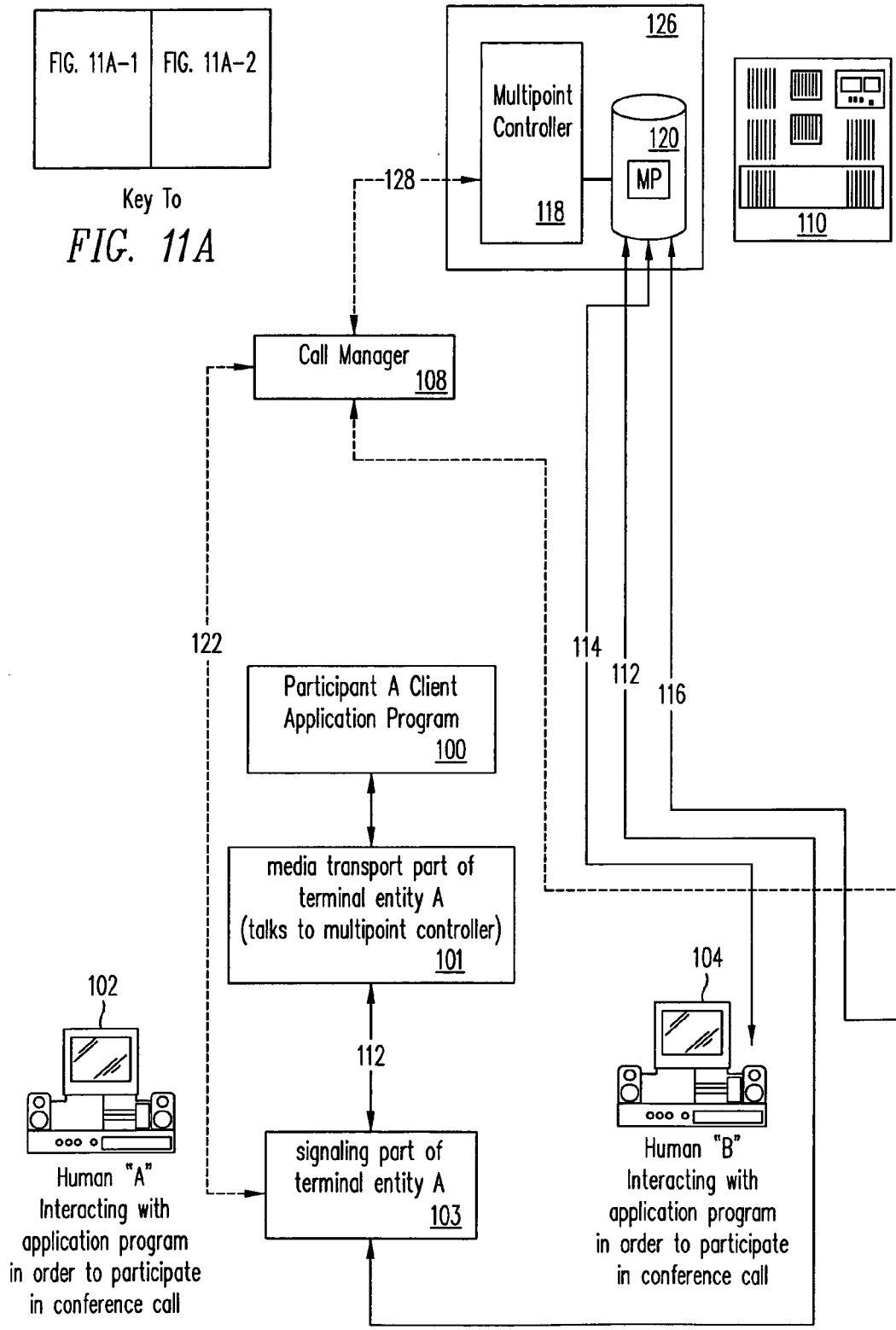
FIG. 11A shows that, if as a result of engaging in process 1548, MC-CMA 702 determines that the desired people specified by user C are either present or waiting to be conferenced in to the conference call and that conditions indicate that terminal C should originate the media transport channel, event 1650 transpires wherein MC-CMA 702 directs 1654 MC-CMA generator 1208 to generate token 1606 containing information that the conference call is ongoing, and the desired participants are present.
Figures 2, 11A:
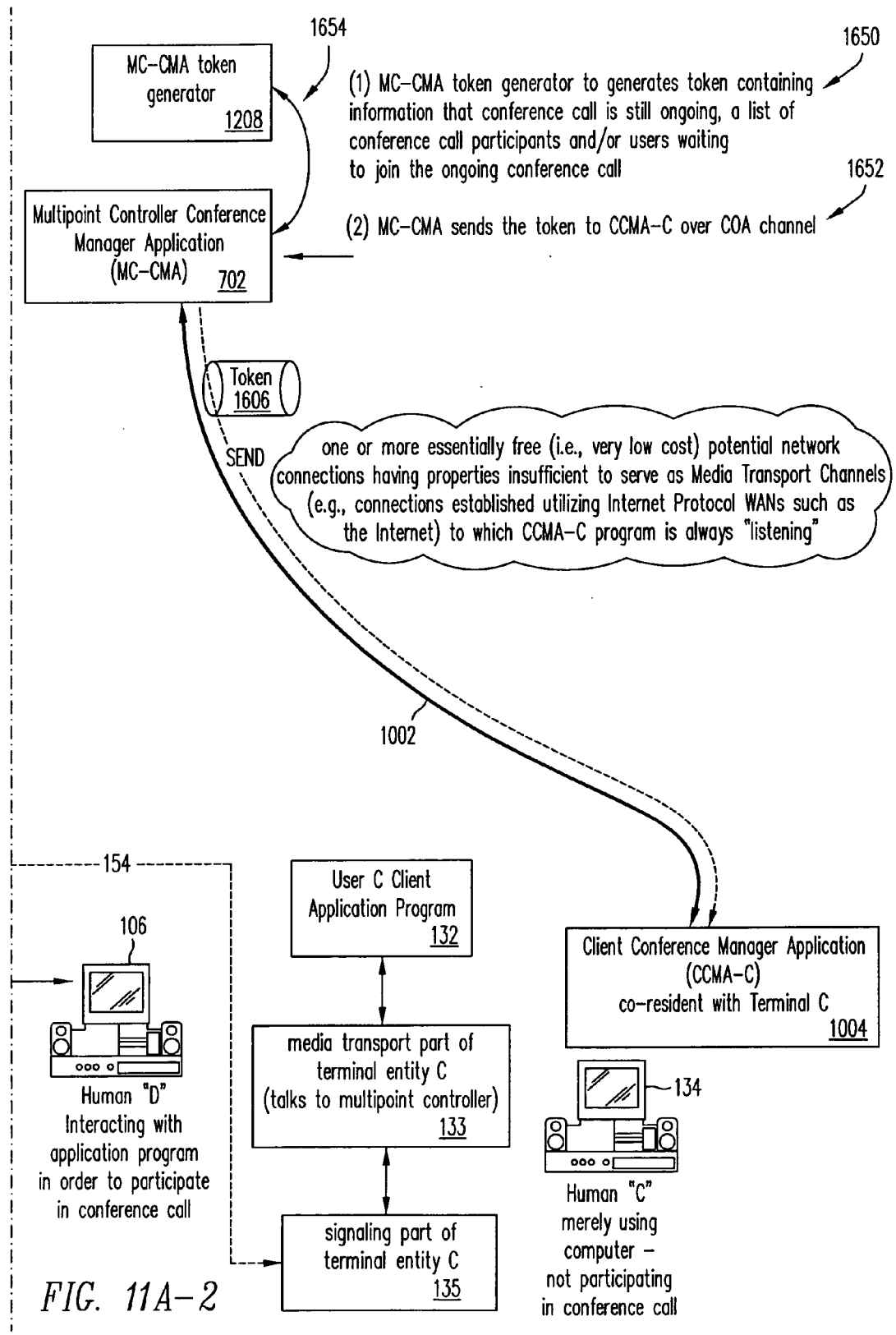

Referring now to FIG. 11A, shown is if as a result of engaging in process 1548, MC-CMA 702 determines that the desired people specified by user C are either present or waiting to be conferenced in to the conference call and that conditions indicate that terminal C should originate the media transport channel, shown is event 1650 wherein MC-CMA 702 directs 1654 MC-CMA generator 1208 to generate token 1606 containing information that the conference call is ongoing, and that the desired users are either participating in or waiting to join the conference call. Thereafter, depicted is event 1652 wherein MC-CMA 702 sends token 1606 to CCMA-C 1004 over COA channel 1002.

Figure 11B:
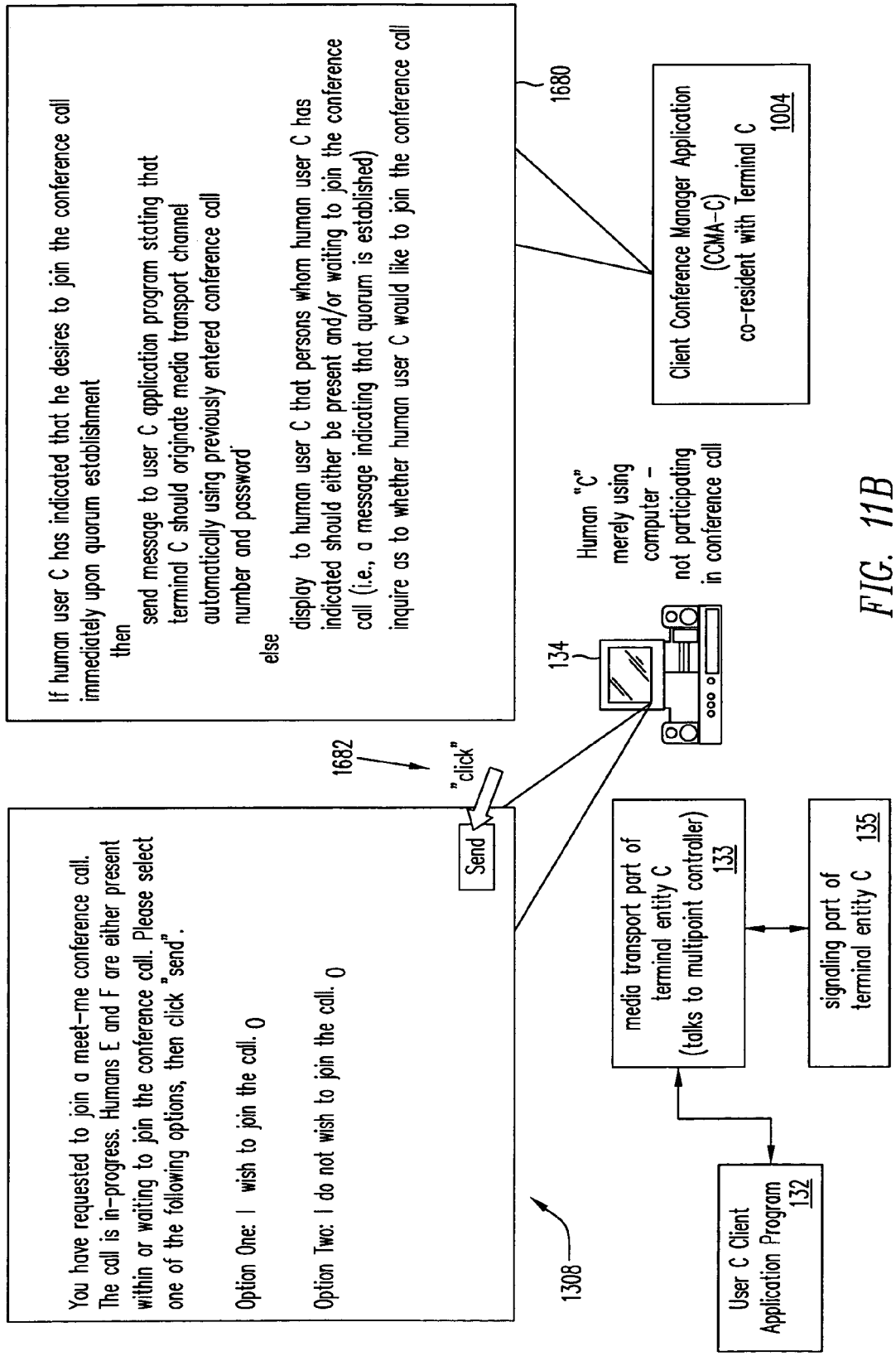
FIG. 11B illustrates that upon receipt of token 1606, CCMA-C 1004, in conjunction with CCMA-C token processor 1304, decodes the information contained in token 1606 and takes actions in response to such information.

With reference now to FIG. 11B, shown is that upon receipt of token 1606, CCMA-C 1004, in conjunction with CCMA-C token processor 1304, decodes the information contained in token 1606. Process 1680 depicts (via use of pseudo-code which is merely exemplary and serves a function analogous to that of a high-level logic flowchart) that if user C has previously indicated via his selection from options presented via GUI 1308 such as was described in relation to FIG. 8, that user C desires to enter the conference call when the users desired by user C were noted as present within or waiting to join the conference call (i.e., the quorum is established), CCMA-C 1004 communicates with user C application program 132, which thereafter causes media transport part 133 to originate a media transport channel with multipoint controller 118, which thereafter works with call manager 108 in order to ensure that media transport part 133 is connected with the appropriate port of multipoint processor 120 so that user C becomes a participant in the ongoing conference call. Alternatively, process 1680 shows that if user C has previously indicated via his selection from options presented via GUI 1308 such as was described in relation to FIG. 8, that user C desires to be notified when the users desired by user C were noted as present within or waiting to join the conference call (i.e., the quorum is established) and asked whether he desires to join the meet-me conference call at that time, CCMA-C 1004 causes such information and option to join to be displayed via GUI 1308. If user C accepts the option (e.g., via "clicking" 1682 the send button), in one embodiment the user joins the meet-me conference call in the traditional fashion, while in another embodiment the previously entered conference call number and password are used to expedite the process.

Figure 12A:
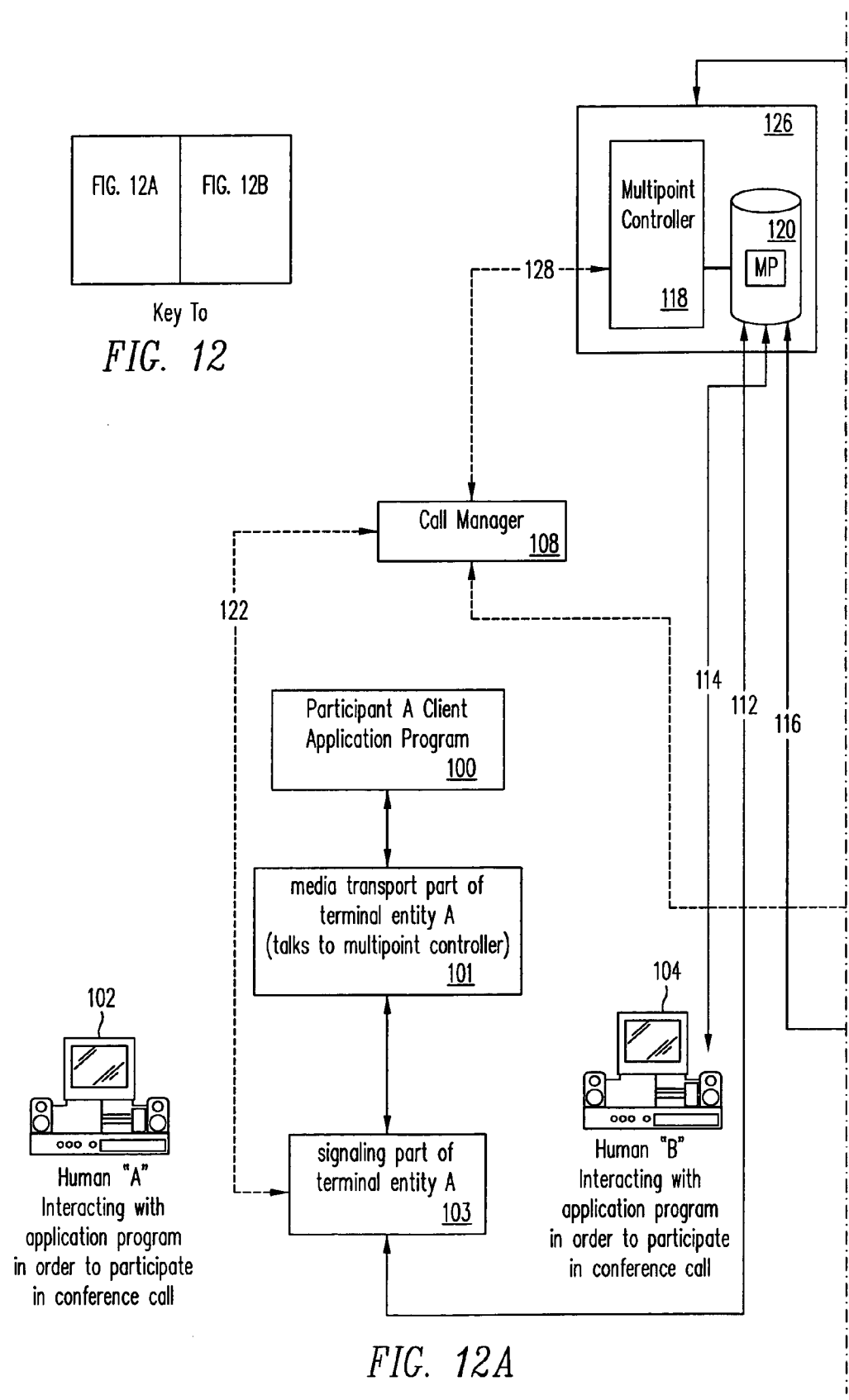
FIG. 12 depicts that media transport channel 144 has been established (e.g., in accord with one or more of the actions described in relation to FIGS. 11A and 11B) between multipoint processor 120 (the port of which has been specified by multipoint controller) and media transport part 133 of terminal entity C.
Figure 12B:
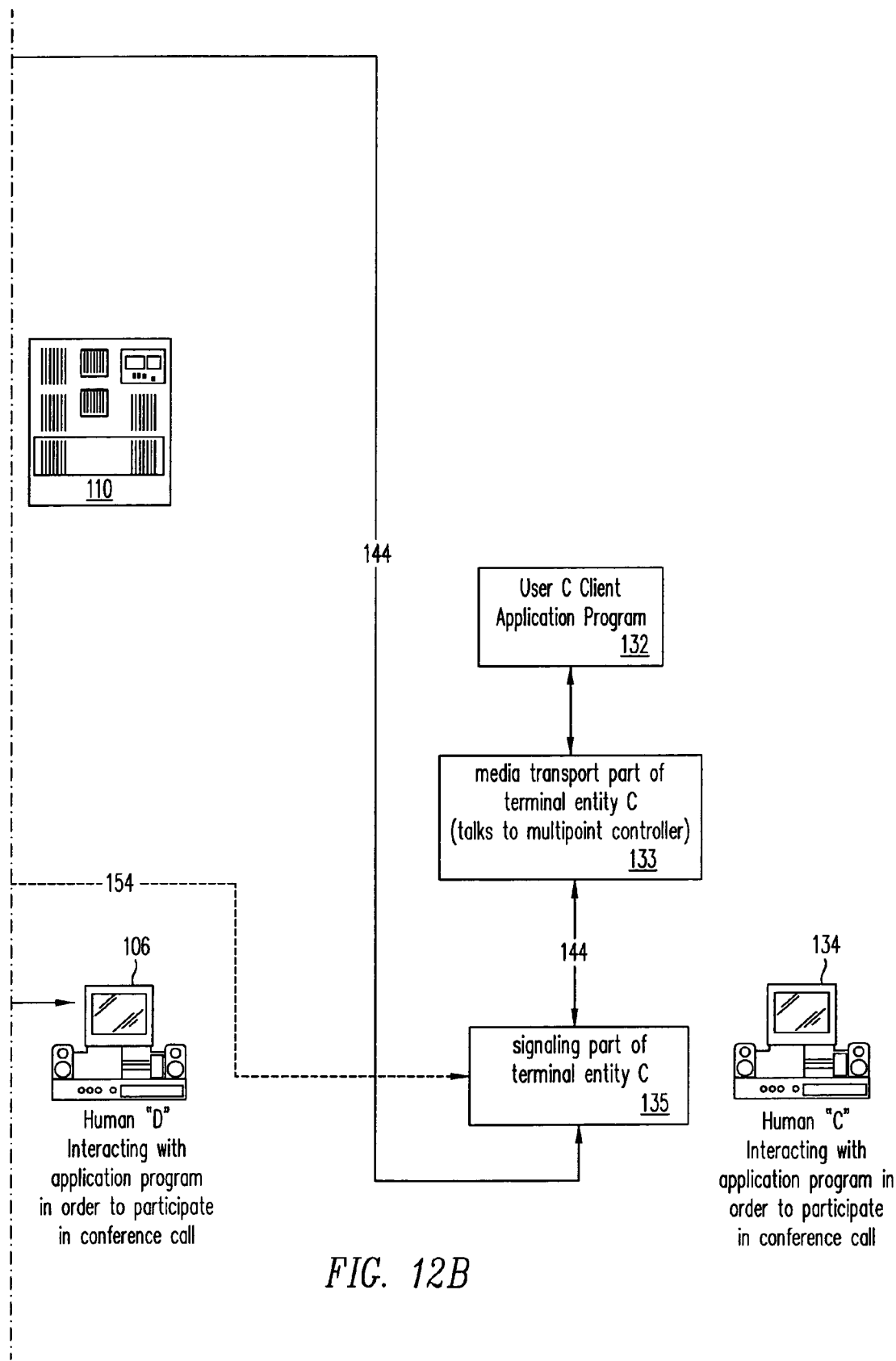

Referring now to FIG. 12, depicted is that media transport channel 144 has been established (e.g., in accord with one or more of the actions described in relation to FIGS. 11A, 11B, and 11C) between multipoint processor 120 (the port of which has been specified by multipoint controller) and media transport part 133 of terminal entity C.

Figure 3:
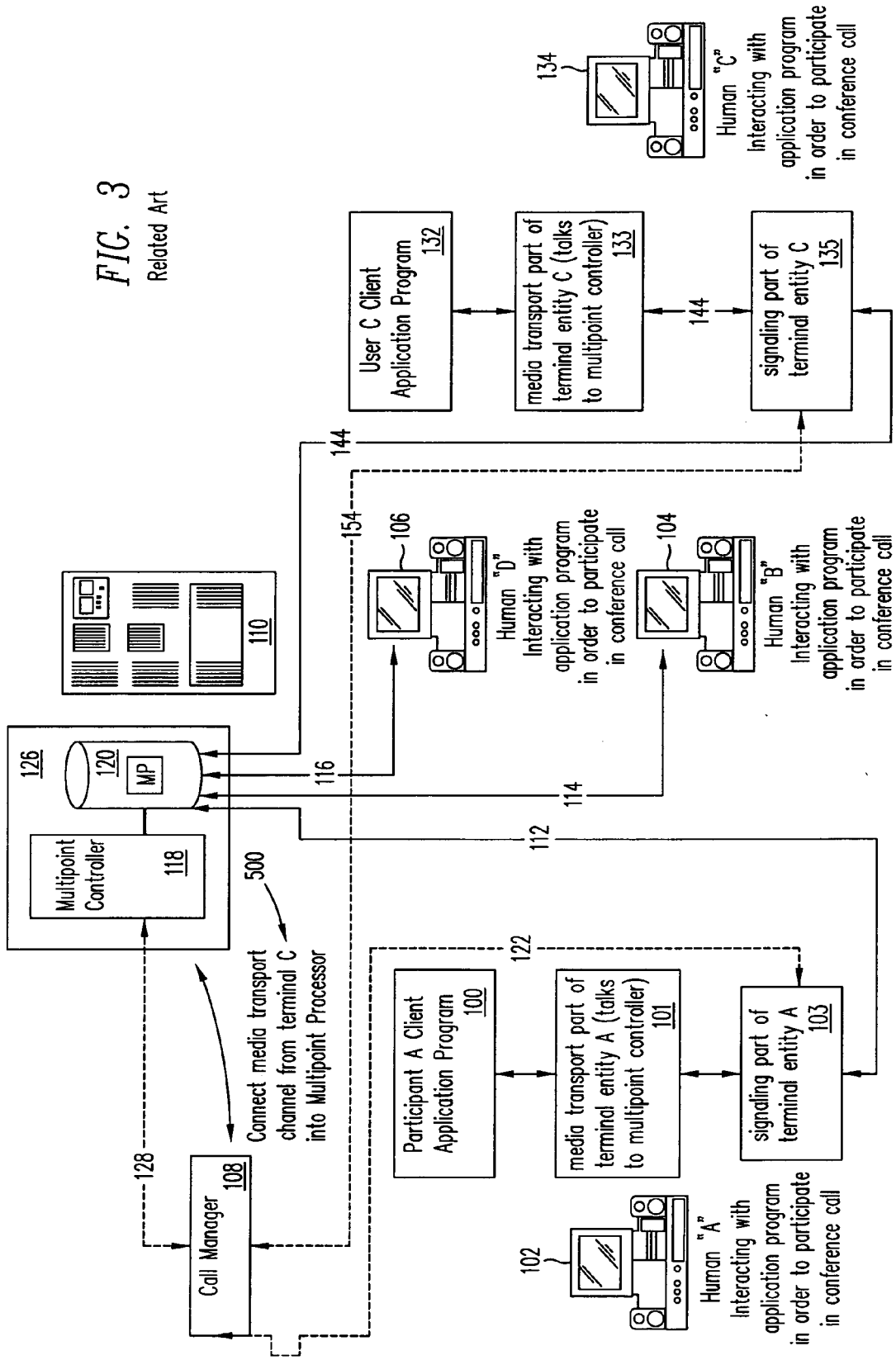
FIG. 3 illustrates events associated with a user joining a related-art conference call.

Note that the state of the network in FIG. 12 is substantially the same as that depicted in related-art FIG. 3. This is an indication the described system and method gives substantial backwards compatibility with the related art.

Alternate Embodiments

The preceding discussion has described quorum specification and subsequent call joining in the context of a user asking to join a meet-me conference call expected to be ongoing. In another embodiment, quorum specification takes place prior to a time at which a meet-me conference call is to transpire (e.g., during scheduling of the meet-me conference call or at some time subsequent to the scheduling and prior to the time the meet-me conference call is to transpire). For example, in one embodiment, a user specifies the quorum when the meet-me conference call is being scheduled. Such specification of the quorum is typically done via use of a graphical user interface such as was described in relation to FIG. 8. In such an alternative embodiment, the user specifies the quorum (e.g., persons specified to have indicated availability to join the meet-me conference call). Thereafter, when the meet-me conference call is to transpire, the MC-CMA, in a fashion analogous to that described in relation to FIG. 10, monitors users indicating availability to join the conference call. When the required quorum (persons required to be available to join the conference call) has been detected, the MC-CMA either (a) originates a COA channel call to the perspective meet-me call conferencees alerting them of the presence of the quorum and asking if the perspective conferencees would like to call in to join the meet-me conference call (e.g., in a fashion analogous to that described in relation to FIG. 9, but where several potential conferencees are contacted at once and invited to join the meet-me conference call), or (b) originates media-transport channels to the potential conferences inquiring if such conferencees desire to join, or (c) engages in a mixture of (a) and (b). There are several different mechanisms whereby it is envisioned that the potential conferencees can be alerted that the quorum has been achieved, such as pager, instant messaging, or other notification services.

In yet another alternate "virtual presence-instant messaging" embodiment, instant messaging services are used to augment the preceding described embodiments of the foregoing discussions. By way of background, those skilled in the art will recognize that instant messaging services provide instant messaging client software for individual user computers which essentially registers a user's username with a computer system running instant messaging server software. Thereafter, after the user has registered his username with the instant messaging server, when the user logs a machine running the user's instant messaging client software into the Internet, the instant messaging client communicates with the instant messaging server to alert the instant messaging server that the user is present within the Internet. In response, the instant messaging server adds the user's instant messaging username to the list of instant messaging usernames which the instant messaging server periodically broadcasts to instant messaging clients present on the Internet. (A good overview of instant messaging can be found in *How the Internet Works* (1999; International Standard Book Number: 0-7897-2132-5; Library of Congress Catalog Card Number: 99-63011), by Preston Gralla, which is hereby incorporated by reference in its entirety (see especially pages 114–116).

The broadcast feature of "instant messaging" is utilized by the MC-CMA to detect the presence and potential availability of a potential conferencee required for quorum. That is, whereas in the embodiments described above the user's CCMA called in to alert the MC-CMA of the presence and/or availability of the user relative to a meet-me conference call, in the "instant messaging" embodiment the MC-CMA utilizes instant messaging software to establish for itself a presence on an instant messaging system. Thereafter, the MC-CMA monitors for the usernames of potential quorum-related conferencees (i.e., usernames associated with users who have been specified as part of a quorum) appearing in the instant messaging name spaces. When and if a potential conferencee appears in the instant messaging name space, the MC-CMA can do several things, such as treat the user associated with the username as available to join the conference call. Thereafter, once quorum has been established the instant messaging software can be utilized by the MC-CMA to originate a call (here the instant messaging software can essentially be used as a "pipe" through which is established the COA channel) to the perspective meet-me call conferencees alerting them as to the presence of the quorum and asking if the perspective conferencees would like to call in to join the meet-me conference call (e.g., in a fashion analogous to that described in relation to FIG. 9). Alternatively, the MC-CMA could either (a) originate a COA channel call to the perspective meet-me call conferencees alerting them of the presence of the quorum and asking if the perspective conferencees would like to call in to join the meet-me conference call (e.g., using the instant messaging service to establish the presence/availability of the users, then proceeding in a fashion analogous to those embodiments described above), or (b) originate media-transport channels to the potential conferences inquiring if such conferencees desire to join, or (c) engages in a mixture of (a) and (b). The foregoing could be done in the various fashions and utilizing the various mechanisms described above.

In yet another alternate "virtual presence-user specified connection address(es) embodiment," the above-set-forth embodiments are modified such that a user can call in (the "calling-in user") to the MC-CMA and inform the MC-CMA as to a connection address (e.g., a phone number) and/or non-media-transport-channel-supporting connection address to be associated with such a calling-in user on a temporary basis. Thereafter, the alternate embodiment will function substantially as described in the various embodiments above, except that the connection address and/or non-media-transport-channel-supporting connection address associated with the calling-in user will be any calling-in user and/or non-media-transport-channel-supporting connection address specified by the user. For example, the calling-in user could call in and specify that the connection address to be associated with the calling-in user be the telephone number of the user's wireless telephone, and that the non-media-transport-channel connection address to be associated with the user be an instant messaging username; another example would be the calling-in user calling in and specifying that the connection address to be associated with the calling-in user be the telephone number of the user's hotel room, and that the non-media-transport-channel connection address to be associated with the user be a wireless web address.

Other Embodiments

The preceding discussion has described processes and devices in the context of a meet-me mode conference call wherein a token is passed. Those having skill in the art will recognize that such token may be passed directly or by reference.

The foregoing discussion has described the establishment and use of a COA channel via addressees. In another embodiment, such COA channels can be augmented by use of a commercially available instant messaging service. For example, insofar as some users do not have permanent Internet Protocol addresses (e.g., users of large commercial Internet Service Providers), in other embodiments, the COA channel can be established via use of the instant messaging service, which can be achieved by the addition of such usernames to the directory 902 as non-media-transport-channel-supporting connection addresses. Thereafter, such usernames can be used to resolve the telephone number of the conference call service maintained by multipoint controller 118 to an instant messaging username of a user having a computer housing a multipoint controller. Subsequently, once such an instant messaging channel has been established, communication will occur in a fashion substantially analogous to the communication described above with respect to the COA channels, except that such communication takes place over the instant messaging service. The modifications required to the above-described system to make use of such commercially available instant messaging systems are well within the skill of one having ordinary skill in the art.

The foregoing discussion has described the specification and/or the establishment of a quorum based on specified persons to be either participating within or available/waiting to join a meet-me conference call. In another embodiment, it is possible to specify a quorum as being a specific number of people (that is, irrespective of the identities of the persons waiting to join a conference call.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using either synchronous or asynchronous communication links (e.g., TDM, packet, ATM, frame based communications links, or any combination of the foregoing described links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical equipment).

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method for joining a meet-me conference call, said method comprising:
    presenting an option to specify a quorum associated with a meet-me conference call, in response to user input to an application program co-resident with a terminal; and
    establishing a media transport channel after detecting that the quorum is established, in response to a user selecting the option, wherein
        the establishing the media transport channel joins the user to the meet-me conference call.

2. The method of claim 1, wherein the user input further includes:
    an indication that the user is requesting to join a meet-me conference call.

3. The method of claim 1, wherein the user input further includes:
    an indication that the user is requesting to specify a quorum at a time selected from the group comprising a time at which a meet-me call is being scheduled, and a time prior to a time at which a meet-me conference call is to transpire.

4. The method of claim 1, wherein the user input further includes:
    a telephone number of a conferencing service and a password for a conference call.

5. The method of claim 1, wherein the user input further includes:
    identification of a virtual presence of the user.

6. The method of claim 5, wherein said identification of the virtual presence of the user further includes:
    identification of at least one connection address selected from the group comprising a land-line telephone number, a wireless telephone number, and a network address.

7. The method of claim 5, wherein said identification of the virtual presence of the user further includes:
    identification of at least one non-media-transport-channel-supporting connection address selected from the group comprising a network address, a wireless web address, and an instant messaging username.

8. The method of claim 1, wherein said presenting an option to specify a quorum associated with a meet-me conference call further comprises:
    presenting an option to specify a quorum associated with the meet-me conference call via at least one device selected from the group comprising an audio device and a visual device.

9. The method of claim 1, wherein said presenting an option to specify a quorum associated with a meet-me conference call further includes:
    presenting an option to join the conference call after at least one designated user either joins or is waiting to join the meet-me conference call.

10. The method of claim 1, wherein said presenting an option to specify a quorum associated with a meet-me conference call further includes:
    presenting a number of users associated with the meet-me conference call, or an identity of at least one user associated with the meet-me conference call.

11. The method of claim 10, wherein said presenting an option to specify a quorum associated with a meet-me conference call further comprises:
    presenting at least one option selected from the group comprising joining the meet-me conference call substantially immediately or joining the conference call after at least one designated user either joins or is waiting to join the meet-me conference call.

12. The method of claim 10, wherein said presenting an option to specify a quorum associated with a meet-me conference call further comprises:
    presenting an option comprising specifying that a complete quorum must be present before a MC-CMA (Multipoint Controller-Call Management Application program) establishes a meet-me conference call.

13. The method of claim 1, further comprising:
    sending a message containing user input to a Multipoint Controller Conference Manager Application (MC-CMA), in response to user input specifying the quorum by indicating that the user desires to wait for at least one user to either join or be waiting to join the meet-me conference call prior to the user joining the conference call.

14. The method of claim 13, wherein the user input specifying the quorum by indicating that the user desires to wait for at least one user to either join or be waiting to join the meet-me conference call prior to the user joining the conference call further includes:

user input specifying that a complete quorum must be present before the MC-CMA (Multipoint Controller-Call Management Application program) establishes a meet-me conference call.

15. The method of claim 13, wherein the user input specifying the quorum by indicating that the user desires to wait for at least one user to either join or be waiting to join the meet-me conference call prior to the user joining the conference call further includes:
   user input specifying that the MC-CMA notifies a Terminal-CCMA (Conference Call Manager Application Program co-resident with a terminal) upon detection of at least one designated user joining or being available to join a meet-me conference call.

16. The method of claim 13, wherein said sending a message containing the user input to a Conference Manager Application (CMA) further comprises:
   sending a message over a Call Optimization Application (COA) channel.

17. The method of claim 16, wherein said sending a message over a Call Optimization (COA) channel further includes:
   establishing an Internet Protocol channel.

18. The method of claim 1, wherein the establishing a media transport channel to join the user to the meet-me conference call comprises:
   originating the media transport channel from the user's terminal in response to a message indicating that the quorum has been established.

19. The method of claim 1, further comprising:
   presenting notification that the quorum associated with the meet-me conference call has been established via at least one device selected from the group comprising an audio device and a visual device proximate to the user's terminal, in response to a message indicating that the quorum has been established.

20. The method of claim 19, wherein the establishing a media transport channel to join the user to the meet-me conference call comprises:
   originating the media transport channel from the user's terminal in response to user input.

21. The method of claim 1, further comprising:
   presenting notification that the quorum associated with the meet-me conference call has been established via at least messaging service selected from the group comprising a paging messaging service, and an instant messaging service.

22. A system for joining a meet-me conference call, said system comprising:
   means for detecting user input to an application program co-resident with a terminal;
   means for presenting an option to specify a quorum associated with a meet-me conference call, in response to the user input to the application program co-resident with the terminal; and
   means for establishing a media transport channel, after detecting that the quorum is established, in response to a user selecting the option, wherein
   establishing the media transport channel joins the user to the meet-me conference call.

23. The system of claim 22, wherein the user input further includes:
   an indication that the user is requesting to join a meet-me conference call.

24. The system of claim 22, wherein the user input further includes:
   an indication that the user is requesting to specify a quorum at a time selected from the group comprising a time at which a meet-me call is being scheduled, and a time prior to a time at which a meet-me conference call is to transpire.

25. The system of claim 22, wherein the user input further includes:
   a telephone number of a conferencing service and a password for a conference call.

26. The system of claim 22, wherein the user input further includes:
   identification of a virtual presence of the user.

27. The system of claim 26, wherein said identification of the virtual presence of the user further includes:
   identification of at least one connection address selected from the group comprising a land-line telephone number, a wireless telephone number, and a network address.

28. The system of claim 26, wherein said identification of the virtual presence of the user further includes:
   identification of at least one non-media-transport-channel-supporting connection address selected from the group comprising a network address, a wireless web address, and an instant messaging username.

29. The system of claim 22, wherein said means for presenting an option to specify a quorum associated with a meet-me conference call further comprises:
   means for presenting an option to specify a quorum associated with the meet-me conference call via at least one device selected from the group comprising an audio device and a visual device.

30. The system of claim 22, wherein said means for presenting an option to specify a quorum associated with a meet-me conference call further includes:
   means for presenting an option to join the conference call after at least one designated user either joins or is waiting to join the meet-me conference call.

31. The system of claim 22, wherein said means for presenting an option to specify a quorum associated with a meet-me conference call further includes:
   means for presenting a number of users associated with the meet-me conference call, or an identity of at least one user associated with the meet-me conference call.

32. The system of claim 31, wherein said means for presenting an option to specify a quorum associated with a meet-me conference call further comprises:
   means for presenting at least one option selected from the group comprising joining the meet-me conference call substantially immediately or joining the conference call after at least one designated user either joins or is waiting to join the meet-me conference call.

33. The system of claim 31, wherein said means for presenting an option to specify a quorum associated with a meet-me conference call further comprises:
   means for presenting an option comprising specifying that a complete quorum must be present before a MC-CMA (Multipoint Controller-Call Management Application program) establishes a meet-me conference call.

34. The system of claim 22, further comprising:
   means for sending a message containing user input to a Multipoint Controller Conference Manager Application (MC-CMA), in response to user input specifying the quorum by indicating that the user desires to wait for at least one user to either join or be waiting to join the meet-me conference call prior to the user joining the conference call.

35. The system of claim 34, wherein the user input specifying the quorum by indicating that the user desires to wait for at least one user to either join or be waiting to join the meet-me conference call prior to the user joining the conference call further includes:

user input specifying that a complete quorum must be present before the MC-CMA (Multipoint Controller-Call Management Application program) establishes a meet-me conference call.

36. The system of claim 34, wherein the user input specifying the quorum by indicating that the user desires to wait for at least one user to either join or be waiting to join the meet-me conference call prior to the user joining the conference call further includes:

user input specifying that the MC-CMA notifies a Terminal-CCMA (Conference Call Manager Application program co-resident with a terminal) upon detection of at least one designated user joining or being available to join a meet-me conference call.

37. The system of claim 34, wherein said means for sending a message containing the user input to a Conference Manager Application (CMA) further comprises:

means for sending a message over a Call Optimization Application (COA) channel.

38. The system of claim 37, wherein said means for sending a message over a Call Optimization (COA) channel further includes:

means for establishing an Internet Protocol channel.

39. The system of claim 22, wherein the means for establishing a media transport channel to join the user to the meet-me conference call comprise:

means for originating the media transport channel from the user's terminal in response to a message indicating that the quorum has been established.

40. The system of claim 22, further comprising:

means for presenting notification that the quorum associated with the meet-me conference call has been established via at least one device selected from the group comprising an audio device and a visual device proximate to the user's terminal, in response to a message indicating that the quorum has been established.

41. The system of claim 40, wherein the means for establishing a media transport channel to join the user to the meet-me conference call comprise:

means for originating the media transport channel from the user's terminal in response to user input.

42. The system of claim 22, further comprising:

presenting notification that the quorum associated with the meet-me conference call has been established via at least messaging service selected from the group comprising a paging messaging service, and an instant messaging service.

43. A computer program product comprising:

a tangible computer readable media storing program instructions, wherein the program instructions are executable to:

present an option to specify a quorum associated with a meet-me conference call, in response to user input to an application program co-resident with a terminal; and initiate establishment of a media transport channel after detecting that the quorum is established, in response to a user selecting the option, wherein establishment of the media transport channel joins the user to the meet-me conference call.

44. A method for joining a meet-me conference call, the method comprising:

presenting an option to specify a quorum associated with a meet-me conference call, in response to user input to an application program co-resident with a terminal; and sending a token to a conference manager application, in response to a user selecting the option, wherein the token comprises information indicating that the user will wait until the quorum is established before joining the meet-me conference call.

45. The method of claim 44, further comprising:

presenting the user with notification that the quorum has been established, in response to detecting that one or more designated users are present within or waiting to join the meet-me conference call.

46. The method of claim 45, wherein the user input comprises:

an indication that the user is requesting to join a meet-me conference call.

47. The method of claim 46, wherein the presenting the option to specify the quorum associated with the meet-me conference call further includes:

presenting an option to join the conference call after at least one designated user either joins or is waiting to join the meet-me conference call.

48. The method of claim 47, wherein the presenting the option to specify the quorum associated with the meet-me conference call further comprises:

presenting an option comprising specifying that a complete quorum must be present before a MC-CMA (Multipoint Controller-Call Management Application program) establishes a meet-me conference call.

49. The method of claim 45, wherein the user input specifying the quorum by indicating that the user desires to wait for at least one user to either join or be waiting to join the meet-me conference call prior to the user joining the conference call further includes:

user input specifying that the MC-CMA notifies a Terminal-CCMA (Conference Call Manager Application Program co-resident with a terminal) upon detection of the one or more designated user joining or being available to join a meet-me conference call.

50. The method of claim 44, wherein the sending the token further comprises:

sending the token over a call optimization application channel.

51. The method of claim 50, wherein the sending the token over a call optimization application channel further includes:

establishing an Internet Protocol channel.

52. The method of claim 50, further comprising:

originating a media transport channel from the user's terminal in response to a message indicating that the quorum has been established.

53. The method of claim 45, wherein the presenting the user with notification that the quorum associated with the meet-me conference call has been established comprises:

presenting the user with the notification via at least messaging service selected from the group comprising a paging messaging service and an instant messaging service.

\* \* \* \* \*